United States Patent
Khan

(10) Patent No.: US 9,275,014 B2
(45) Date of Patent: Mar. 1, 2016

(54) VECTOR PROCESSING ENGINES HAVING PROGRAMMABLE DATA PATH CONFIGURATIONS FOR PROVIDING MULTI-MODE RADIX-$2^X$ BUTTERFLY VECTOR PROCESSING CIRCUITS, AND RELATED VECTOR PROCESSORS, SYSTEMS, AND METHODS

(71) Applicant: QUALCOMM Incorporated, San Diego, CA (US)

(72) Inventor: Raheel Khan, Tustin, CA (US)

(73) Assignee: QUALCOMM Incorporated, San Diego, CA (US)

( * ) Notice: Subject to any disclaimer, the term of this patent is extended or adjusted under 35 U.S.C. 154(b) by 337 days.

(21) Appl. No.: 13/798,599

(22) Filed: Mar. 13, 2013

(65) Prior Publication Data

US 2014/0280420 A1 Sep. 18, 2014

(51) Int. Cl.
*G06F 17/14* (2006.01)
*G06F 9/30* (2006.01)
(Continued)

(52) U.S. Cl.
CPC ............ *G06F 17/142* (2013.01); *G06F 7/5443* (2013.01); *G06F 9/3001* (2013.01);
(Continued)

(58) Field of Classification Search
CPC ..... G06F 17/142; G06F 7/768; G06F 17/141; G06F 7/5443; H04L 27/265; H04L 27/2628
USPC .......................... 708/404, 408–409, 523–524
See application file for complete search history.

(56) References Cited

U.S. PATENT DOCUMENTS

| 5,778,241 A | 7/1998 | Bindloss et al. |
| 5,805,875 A | 9/1998 | Asanovic |

(Continued)

FOREIGN PATENT DOCUMENTS

| CN | 102375805 A | 3/2012 |
| CN | 102637124 A | 8/2012 |

(Continued)

OTHER PUBLICATIONS

Palkovic, et al., "Time-Space Energy Consumption Modeling of Dynamic Reconfigurable Coarse-Grain Array Processor Datapath for Wireless Applications", IEEE Workshop on Signal Processing Systems, SiPS, 2010, pp. 134-139.

(Continued)

*Primary Examiner* — Tan V. Mai
(74) *Attorney, Agent, or Firm* — Novak Druce Connolly Bove + Quigg LLP

(57) ABSTRACT

Vector processing engines (VPEs) having programmable data path configurations for providing multi-mode Radix-$2^X$ butterfly vector processing circuits. Related vector processors, systems, and methods are also disclosed. The VPEs disclosed herein include a plurality of vector processing stages each having vector processing blocks that have programmable data path configurations for performing Radix-$2^X$ butterfly vector operations to perform Fast Fourier Transform (FFT) vector processing operations efficiently. The data path configurations of the vector processing blocks can be programmed to provide different types of Radix-$2^X$ butterfly vector operations as well as other arithmetic logic vector operations. As a result, fewer VPEs can provide desired Radix-$2^X$ butterfly vector operations and other types arithmetic logic vector operations in a vector processor, thus saving area in the vector processor while still retaining vector processing advantages of fewer register writes and faster vector instruction execution times over scalar processing engines.

29 Claims, 15 Drawing Sheets

(51) Int. Cl.
*G06F 9/38* (2006.01)
*G06F 7/544* (2006.01)
*G06F 15/80* (2006.01)

(52) U.S. Cl.
CPC .......... *G06F 9/30036* (2013.01); *G06F 9/3887* (2013.01); *G06F 9/3897* (2013.01); *G06F 15/8053* (2013.01); *G06F 2207/382* (2013.01)

(56) References Cited

U.S. PATENT DOCUMENTS

| | | | |
|---|---|---|---|
| 6,006,245 | A | 12/1999 | Thayer |
| 7,159,099 | B2 | 1/2007 | Lucas et al. |
| 7,272,751 | B2 | 9/2007 | Beacom et al. |
| 7,299,342 | B2 * | 11/2007 | Nilsson et al. ............... 712/222 |
| 7,519,646 | B2 | 4/2009 | Kaul et al. |
| 7,702,712 | B2 | 4/2010 | Krishnamoorthi et al. |
| 8,051,123 | B1 | 11/2011 | Oberman et al. |
| 8,156,284 | B2 | 4/2012 | Vorbach et al. |
| 8,320,478 | B2 | 11/2012 | Singh et al. |
| 8,341,204 | B2 | 12/2012 | Arakawa et al. |
| 2003/0009502 | A1* | 1/2003 | Katayanagi ............... 708/622 |
| 2003/0105949 | A1* | 6/2003 | Master et al. ............... 713/100 |
| 2004/0193837 | A1 | 9/2004 | Devaney et al. |
| 2005/0165878 | A1 | 7/2005 | Kwon |
| 2007/0106718 | A1 | 5/2007 | Shum et al. |
| 2007/0185953 | A1 | 8/2007 | Prokopenko et al. |
| 2008/0243976 | A1 | 10/2008 | Wiencke |
| 2011/0072236 | A1 | 3/2011 | Mimar |
| 2013/0031154 | A1 | 1/2013 | Wiencke et al. |

FOREIGN PATENT DOCUMENTS

| | | |
|---|---|---|
| WO | 9938089 A1 | 7/1999 |
| WO | 9945462 A1 | 9/1999 |
| WO | 2005057423 | 6/2005 |
| WO | 2012149871 A1 | 11/2012 |
| WO | 2014164367 | 10/2014 |
| WO | 2014164931 | 10/2014 |

OTHER PUBLICATIONS

Sun, et al., "Multiple-Precision Subword-Parallel Multiplier using Correction-Value Merging Technique", ASICON International Conference, 2007, pp. 48-51.

Athanas P., et al., "An Overview of Configurable Computing Machines for Software Radio Handsets", IEEE Communications Magazine, IEEE Service Center, Piscataway, US, vol. 41 (7), Jul. 1, 2003, pp. 134-141.

Ciricescu S., et al., "The Reconfigurable Streaming Vector Processor (RSVP)", Microarchitecture, 2003, Proceedings, 36th Annual IEEE/ACM International Symposium on Dec. 3-5, 2003, Piscataway, NJ, USA, IEEE, pp. 141-150.

Parhami B., et al., "Computer Arithmetic, Algorithms and Hardware Designs" In: "Computer Arithmetic, Algorithms and Hardware Designs", 2000, Oxford University Press, New York, XP055132227, ISBN: 978-0-19-512583-2 pp. 128-133, 203, 204, 468-469, section 12.6, 4th paragraph, 3rd sentence, figure 12.19(b) p. 468, paragraph 6; figure 28.2.

Co-pending U.S. Appl. No. 13/798,618, filed Mar. 13, 2013.
Co-pending U.S. Appl. No. 13/798,641, filed Mar. 13, 2013.
Co-pending U.S. Appl. No. 14/082,067, filed Nov. 15, 2013.
Co-pending U.S. Appl. No. 14/082,073, filed Nov. 15, 2013.
Co-pending U.S. Appl. No. 14/082,075, filed Nov. 15, 2013.
Co-pending U.S. Appl. No. 14/082,079, filed Nov. 15, 2013.
Co-pending U.S. Appl. No. 14/082,081, filed Nov. 15, 2013.
Co-pending U.S. Appl. No. 14/082,088, filed Nov. 15, 2013.

Derby J.H., et al., "A high-performance embedded DSP core with novel SIMD features", Proceedings of International Conference on Acoustics, Speech and Signal Processing (ICASSP'03) Apr. 6-10, 2003 Hong Kong, China; [IEEE International Conference on Acoustics, Speech, and Signal Processing (ICASSP)], IEEE, 2003 IEEE International Confe, vol. 2, Apr. 6, 2003, pp. 301-304.

International Search Report and Written Opinion—PCT/US2014/021782—ISA/EPO—May 18, 2015.

Schoenes M., et al., "A novel SIMD DSP architecture for software defined radio", Midwest Symposium on Circuits and Systems, Cairo, Egypt, Dec. 27-30, 2003; [Midwest Symposium on Circuits and Systems], Piscataway, NJ, IEEE, US, vol. 3, Dec. 27, 2003, p. 1443, XP010866282, DOI: 10.1109/MWSCAS.2003.1562567 ISBN: 978-0-7803-8294-7 section II; figures 2, 3.

Taiwan Search Report—TW103107652—TIPO—Sep. 17, 2015.

Takala J., et al., "Butterfly unit supporting radix-4 and radix-2 FFT", Proceedings of The 2005 International TICSP Workshop on Spectral Methods and Multirate Signal Processing (SMMSP2005), Jun. 20-22, 2005, Riga, Latvia, pp. 47-54, XP055135685.

* cited by examiner

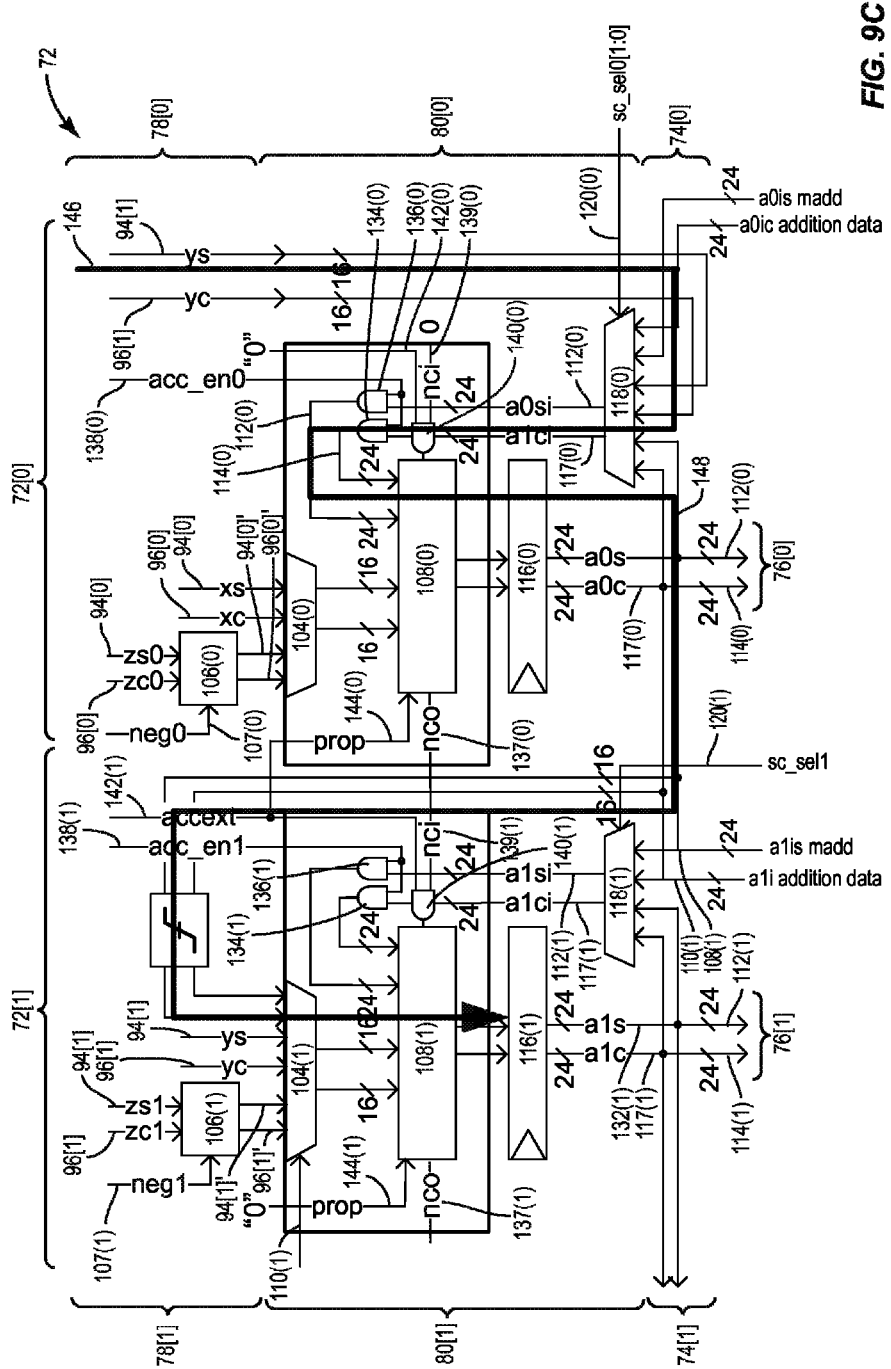

VECTOR PROCESSING ENGINES HAVING PROGRAMMABLE DATA PATH CONFIGURATIONS FOR PROVIDING MULTI-MODE RADIX-$2^x$ BUTTERFLY VECTOR PROCESSING CIRCUITS, AND RELATED VECTOR PROCESSORS, SYSTEMS, AND METHODS

RELATED APPLICATIONS

The present application is also related to U.S. patent application Ser. No. 11/083,953 entitled "Vector Processing Carry-Save Accumulators Employing Redundant Carry-Save Format To Reduce Carry Propagation, And Related Vector Processors, Systems, And Methods," filed on Mar. 13, 2013 and incorporated herein by reference in its entirety.

The present application is related to U.S. patent application Ser. No. 10/834,142 entitled "Vector Processing Engines Having Programmable Data Path Configurations For Providing Multi-Mode Vector Processing, And Related Vector Processors, Systems, and Methods," filed on Mar. 13, 2013 and incorporated herein by reference in its entirety.

BACKGROUND

I. Field of the Disclosure

The field of the disclosure relates to vector processors and related systems for processing vector and scalar operations, including single instruction, multiple data (SIMD) processors and multiple instruction, multiple data (MIMD) processors.

II. Background

Wireless computing systems are fast becoming one of the most prevalent technologies in the digital information arena. Advances in technology have resulted in smaller and more powerful wireless communications devices. For example, wireless computing devices commonly include portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless communications devices include other types of devices. For example, a wireless telephone may include a digital still camera, a digital video camera, a digital recorder, and/or an audio file player. Also, wireless telephones can include a web interface that can be used to access the Internet. Further, wireless communications devices may include complex processing resources for processing high speed wireless communications data according to designed wireless communications technology standards (e.g., code division multiple access (CDMA), wideband CDMA (WCDMA), and long term evolution (LTE)). As such, these wireless communications devices include significant computing capabilities.

As wireless computing devices become smaller and more powerful, they become increasingly resource constrained. For example, screen size, amount of available memory and file system space, and amount of input and output capabilities may be limited by the small size of the device. Further, battery size, amount of power provided by the battery, and life of the battery are also limited. One way to increase the battery life of the device is to design processors that consume less power.

In this regard, baseband processors may be employed for wireless communications devices that include vector processors. Vector processors have a vector architecture that provides high-level operations that work on vectors, i.e. arrays of data. Vector processing involves fetching a vector instruction once and then executing the vector instruction multiple times across an entire array of data elements, as opposed to executing the vector instruction on one set of data and then re-fetching and decoding the vector instruction for subsequent elements within the vector. This process allows the energy required to execute a program to be reduced, because among other factors, each vector instruction needs to be fetched fewer times. Since vector instructions operate on long vectors over multiple clock cycles at the same time, a high degree of parallelism is achievable with simple in-order vector instruction dispatch.

FIG. 1 illustrates an exemplary baseband processor 10 that may be employed in a computing device, such as a wireless computer device. The baseband processor 10 includes multiple processing engines (PEs) 12 each dedicated to providing function-specific vector processing for specific applications. In this example, six (6) separate PEs 12(0)-12(5) are provided in the baseband processor 10. The PEs 12(0)-12(5) are each configured to provide vector processing for fixed X-bit wide vector data 14 provided from a shared memory 16 to the PEs 12(0)-12(5). For example, the vector data 14 could be 512 bits wide. The vector data 14 can be defined in smaller multiples of X-bit width vector data sample sets 18(0)-18(Y) (e.g., 16-bit and 32-bit sample sets). In this manner, the PEs 12(0)-12(5) are capable of providing vector processing on multiple vector data sample sets provided in parallel to the PEs 12(0)-12(5) to achieve a high degree of parallelism. Each PE 12(0)-12(5) may include a vector register file (VR) for storing the results of a vector instruction processed on the vector data 14.

Each PE 12(0)-12(5) in the baseband processor 10 in FIG. 1 includes specific, dedicated circuitry and hardware specifically designed to efficiently perform specific types of fixed operations. For example, the baseband processor 10 in FIG. 1 includes separate Wideband Code Division Multiple Access (WCDMA) PEs 12(0), 12(1) and Long Term Evolution (LTE) PEs 12(4), 12(5), because WCDMA and LTE involve different types of specialized operations. Thus, by providing separate WCDMA-specific PEs 12(0), 12(1) and LTE-specific PEs 12(4), 12(5), each of the PEs 12(0), 12(1), 12(4), 12(5) can be designed to include specialized, dedicated circuitry that is specific to frequently performed functions for WCDMA and LTE for highly efficient operation. This design is in contrast to scalar processing engines that include more general circuitry and hardware designed to be flexible to support a larger number of unrelated operations, but in a less efficient manner.

Vector accumulation operations are commonly performed in PEs. In this regard, PEs include function-specific accumulator structures each having specialized circuitry and hardware to support specific vector accumulation operations for efficient processing. Examples of common vector operations supported by PEs employing vector accumulation operations include filtering operations, correlation operations, and Radix-$2^X$ (e.g., Radix-2 and Radix-4) butterfly operations commonly used for performing Fast Fourier Transform (FFT) vector processing operations for wireless communications algorithms, as examples. Providing function-specific accumulator structures in PEs is advantageous for frequently executed, specialized accumulation operations. However, providing function-specific accumulator structures in PEs can increase area and power needed for the baseband processor, because the separate function-specific accumulator structures provided in the PEs each include specialized circuitry and memories.

SUMMARY OF THE DISCLOSURE

Embodiments disclosed herein include vector processing engines (VPEs) having programmable data path configurations for providing multi-mode Radix-$2^X$ butterfly vector processing circuits. Related vector processors, systems, and methods are also disclosed. The VPEs disclosed herein include a plurality of vector processing stages each having vector processing blocks that have programmable data path configurations for performing Radix-$2^X$ butterfly vector operations to perform Fast Fourier Transforms (FFT) vector processing efficiently. The data path configurations of the vector processing blocks can be programmed to provide different types of Radix-$2^X$ butterfly vector operations as well as other arithmetic logic vector operations. As a result, fewer VPEs can provide desired Radix-$2^X$ butterfly vector operations and other types of arithmetic logic vector operations in a vector processor, thus saving area in the vector processor while still retaining vector processing advantages of fewer register writes and faster vector instruction execution times over scalar processing engines.

In this regard, in certain embodiments disclosed herein, a plurality of multiplier blocks having programmable data path configurations are provided in a vector processing stage in a VPE. The plurality of multiplier blocks are fused with a plurality of accumulator blocks having programmable data path configurations provided in another vector processing stage in the VPE. The data paths of each multiplier block can be programmed to provide multiplication for a point of a Radix-$2^X$ butterfly vector operation according to the particular Radix-$2^X$ butterfly vector instruction being executed. The data paths of each accumulator block can be programmed to accumulate the Radix-$2^X$ butterfly multiplication products from a multiplier block among the plurality of multiplier blocks according to the Radix-$2^X$ butterfly vector instruction being executed. The data path configurations of the accumulator blocks can also be reprogrammed in other cycles to accumulate Radix-$2^x$ butterfly multiplication products from other multiplier blocks among the plurality of multiplier blocks according to the Radix-$2^X$ butterfly vector instruction being executed. The final accumulated Radix-$2^X$ butterfly multiplication products accumulated by the accumulator blocks can provide N points of a FFT vector processing operation.

The VPEs having programmable data path configurations for providing multi-mode Radix-$2^X$ butterfly vector processing are distinguishable from VPEs that only include fixed data path configurations to provide fixed functions. The VPEs having programmable data path configurations for providing multi-mode Radix-$2^X$ butterfly vector processing disclosed herein are also distinguishable from scalar processing engines, such as those provided in digital signal processors (DSPs) for example. Scalar processing engines employ flexible, common circuitry and logic to perform different types of non-fixed functions, but also write intermediate results during vector instruction execution to register files, thereby consuming additional power and increasing vector instruction execution times.

In this regard in one embodiment, a VPE configured to provide at least one multi-mode Radix-$2^X$ butterfly vector processing circuit is provided. The VPE comprises at least one multiply vector processing stage comprising at least one multiplier block. Each multiplier block is configured to receive a Radix vector data input sample set from a plurality of Radix vector data input sample sets from a first input data path among a plurality of input data paths. Each multiplier block is also configured multiply the Radix vector data input sample set with a twiddle factor component to provide a Radix vector multiply output sample set in a plurality of multiply output data paths based on a programmable multiply data path configuration according to a Radix butterfly vector instruction executed by the at least one multiply vector processing stage. The VPE also comprises at least one accumulation vector processing stage comprising a plurality of accumulator blocks. Each accumulator block among the plurality of accumulator blocks is configured to receive a plurality of Radix vector multiply output sample sets from a multiply output data path among the plurality of multiply output data paths based on an accumulator programmable accumulator data path configuration. Each accumulator block among the plurality of accumulator blocks is further configured accumulate the received plurality of Radix vector multiply output sample sets to provide a Radix vector accumulated result sample set based on the accumulator programmable accumulator data path configuration. Each accumulator block among the plurality of accumulator blocks is further configured provide the Radix vector accumulated result sample set in an output data path among a plurality of output data paths. The VPE also comprises an output processing stage configured to receive the plurality of Radix vector accumulated result sample sets from each of the plurality of accumulator blocks.

In another embodiment, a VPE configured to provide at least one multi-mode Radix-$2^X$ butterfly vector processing circuit is provided. The VPE comprises at least one multiply vector processing stage means comprising at least one multiplier block means. Each multiplier block means is configured to receive a Radix vector data input sample set from a plurality of Radix vector data input sample sets from a first input data path among a plurality of input data paths. Each multiplier block means is also configured multiply the Radix vector data input sample set with a twiddle factor component to provide a Radix vector multiply output sample set in a plurality of multiply output data paths based on a programmable multiply data path configuration according to a Radix butterfly vector instruction executed by the at least one multiply vector processing stage means. The VPE also comprises at least one accumulation vector processing stage means comprising a plurality of accumulator block means. Each accumulator block means among the plurality of accumulator block means is configured to receive a plurality of Radix vector multiply output sample sets from a multiply output data path among the plurality of multiply output data paths based on an programmable accumulator data path configuration. Each accumulator block means among the plurality of accumulator block means is further configured accumulate the received plurality of Radix vector multiply output sample sets to provide a Radix vector accumulated result sample set based on the programmable accumulator data path configuration. Each accumulator block means among the plurality of accumulator block means is further configured provide the Radix vector accumulated result sample set in an output data path among a plurality of output data paths. The VPE also comprises an output processing stage means configured to receive the plurality of Radix vector accumulated result sample sets from each of the plurality of accumulator blocks.

In another embodiment, a method of processing Radix-$2^X$ vector data in a multi-mode Radix-$2^X$ butterfly vector processing circuit processing in a vector processing engine (VPE) is provided. The method comprises receiving a Radix vector data input sample set from a plurality of Radix vector data input sample sets from a first input data path among a plurality of input data paths in at least one multiplier block in at least one multiply vector processing stage. The method also comprises multiplying in the at least one multiplier block, the Radix vector data input sample set with a twiddle factor component to provide a Radix vector multiply output sample set in a plurality of multiply output data paths based on a programmable multiply data path configuration according to a Radix butterfly vector instruction executed by the at least one multiply vector processing stage. The method also comprises receiving a plurality of Radix vector multiply output sample sets from a multiply output data path among the plurality of multiply output data paths based on an accumulator programmable accumulator data path configuration in an accumulator block among a plurality of accumulator blocks in at least one accumulation vector processing stage. The method also comprises accumulating the received plurality of Radix vector multiply output sample sets to provide a Radix vector accumulated result sample set based on the accumulator programmable accumulator data path configuration. The method also comprises providing the Radix vector accumulated result sample set in an output data path among a plurality of output data paths. The method also comprises receiving in an output processing stage, the plurality of Radix vector accumulated result sample sets from each of the plurality of accumulator blocks.

In another embodiment, a vector processor is provided. The vector processor comprises at least one vector register configured to receive a Radix vector data input sample set from a vector data memory. The vector processor also comprises at least one vector result register configured to store a Radix vector result output sample set. The vector processor also comprises a VPE. The VPE comprises at least one multiply vector processing stage. The multiply vector processing stage is configured to receive the Radix vector data input sample set from a plurality of Radix vector data input sample sets from a first input data path among a plurality of input data paths in at least one multiplier block in at least one multiply vector processing stage. The multiply vector processing stages is also configured to multiply in the at least one multiplier block, the Radix vector data input sample set with a twiddle factor component to provide a Radix vector multiply output sample set in a plurality of multiply output data paths based on a programmable multiply data path configuration according to a Radix butterfly vector instruction executed by the at least one multiply vector processing stage. The VPE also comprises at least one accumulation vector processing stage. The accumulation vector processing stage is configured to receive a plurality of Radix vector multiply output sample sets from a multiply output data path among the plurality of multiply output data paths based on an programmable accumulator data path configuration in each accumulator block among a plurality of accumulator blocks in at least one accumulation vector processing stage. The accumulation vector processing stage is also configured to accumulate in at least one accumulator block, the received plurality of Radix vector multiply output sample sets to provide a Radix vector accumulated result sample set based on the programmable accumulator data path configuration. The accumulation vector processing stage is also configured to provide the Radix vector accumulated result sample set in an output data path among a plurality of output data paths. The VPE also comprises an output processing stage configured to receive a plurality of Radix vector accumulated result sample sets from each of the plurality of accumulator blocks.

BRIEF DESCRIPTION OF FIGURES

FIG. 9C is a schematic diagram of the accumulator block of FIG. 8 having data path configurations programmed for providing a 16-bit carry-save adder followed by a single 24-bit accumulator mode;

DETAILED DESCRIPTION

Figure 1:
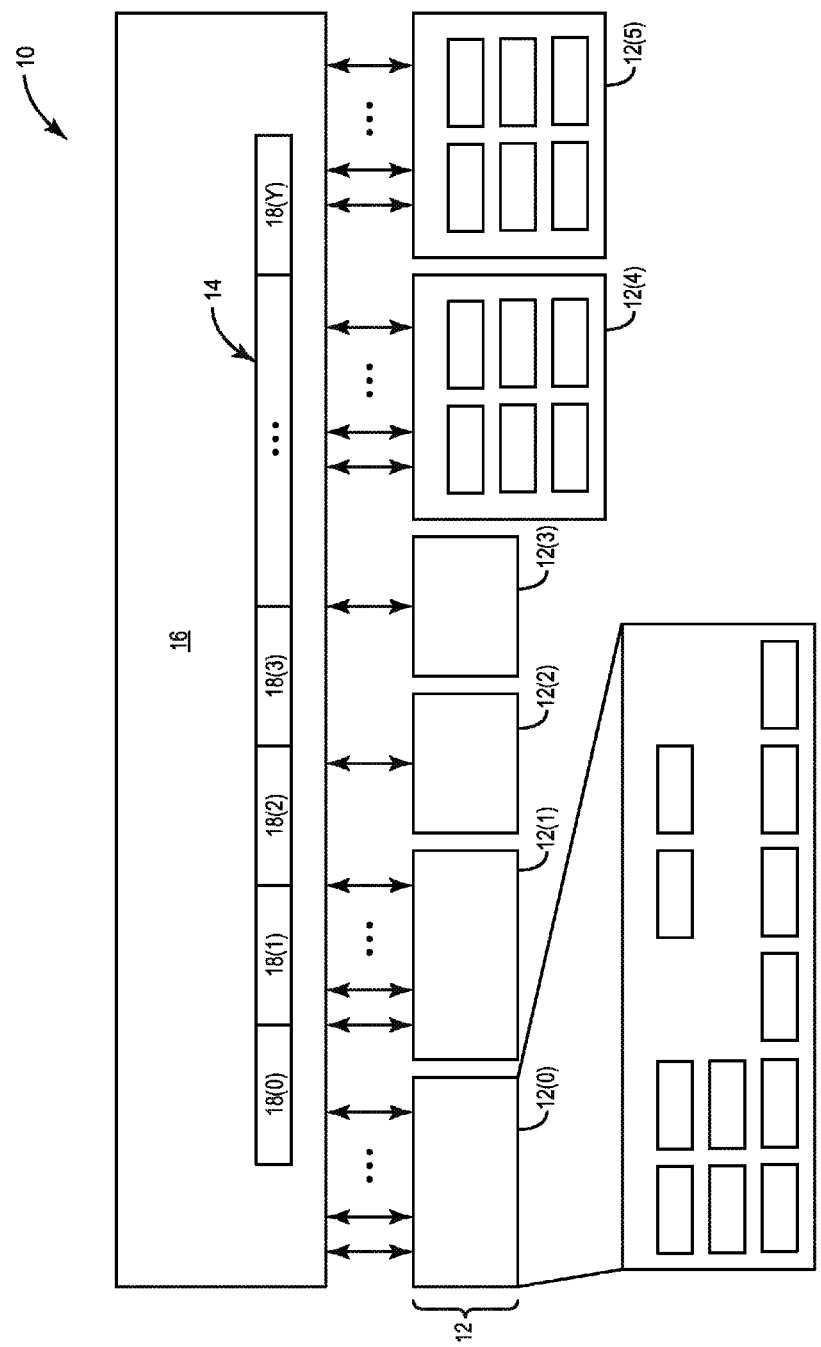
FIG. 1 is a schematic diagram of an exemplary vector processor that includes multiple vector processing engines (VPEs) each dedicated to providing function-specific vector processing for specific applications.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed herein include vector processing engines (VPEs) having programmable data path configurations for providing multi-mode Radix-$2^X$ butterfly vector processing. Related vector processors, systems, and methods are also disclosed. The VPEs disclosed herein include a plurality of vector processing stages each having vector processing blocks that have programmable data path configurations for performing Radix-$2^X$ butterfly vector operations to perform Fast Fourier Transforms (FFT) vector processing operations efficiently. The data path configurations of the vector processing blocks can be programmed to provide different types of Radix-$2^X$ butterfly vector operations as well as other arithmetic logic vector operations. As a result, fewer VPEs can provide desired Radix-$2^X$ butterfly vector operations and other types of arithmetic logic vector operations in a vector processor, thus saving area in the vector processor while still retaining vector processing advantages of fewer register writes and faster vector instruction execution times over scalar processing engines.

In this regard, in certain embodiments disclosed herein, a plurality of multiplier blocks having programmable data path configurations are provided in a vector processing stage in a VPE. The plurality of multiplier blocks are fused with a plurality of accumulator blocks having programmable data path configurations provided in another vector processing stage in the VPE. The data paths of each multiplier block can be programmed to provide multiplication for a point of a Radix-$2^X$ butterfly vector operation according to the particular Radix-$2^X$ butterfly vector instruction being executed. The data paths of each accumulator block can be programmed to accumulate the Radix-$2^X$ butterfly multiplication products from a multiplier block among the plurality of multiplier blocks according to the Radix-$2^X$ butterfly vector instruction being executed. The data paths configurations of the accumulator blocks can also be reprogrammed in other cycles to accumulate Radix-$2^X$ butterfly multiplication products from other multiplier blocks among the plurality of multiplier blocks according to the Radix-$2^X$ butterfly vector instruction being executed. The final accumulated Radix-$2^X$ butterfly multiplication products accumulated by the accumulator blocks can provide N points of a FFT vector processing operation.

The VPEs having programmable data path configurations for providing multi-mode Radix-$2^X$ butterfly vector processing are distinguishable from VPEs that only include fixed data path configurations to provide fixed functions. The VPEs having programmable data path configurations for providing multi-mode Radix-$2^X$ butterfly vector processing disclosed herein are also distinguishable from scalar processing engines, such as those provided in digital signal processors (DSPs) for example. Scalar processing engines employ flexible, common circuitry and logic to perform different types of non-fixed functions, but also write intermediate results during vector instruction execution to register files, thereby consuming additional power and increasing vector instruction execution times.

Figure 2:
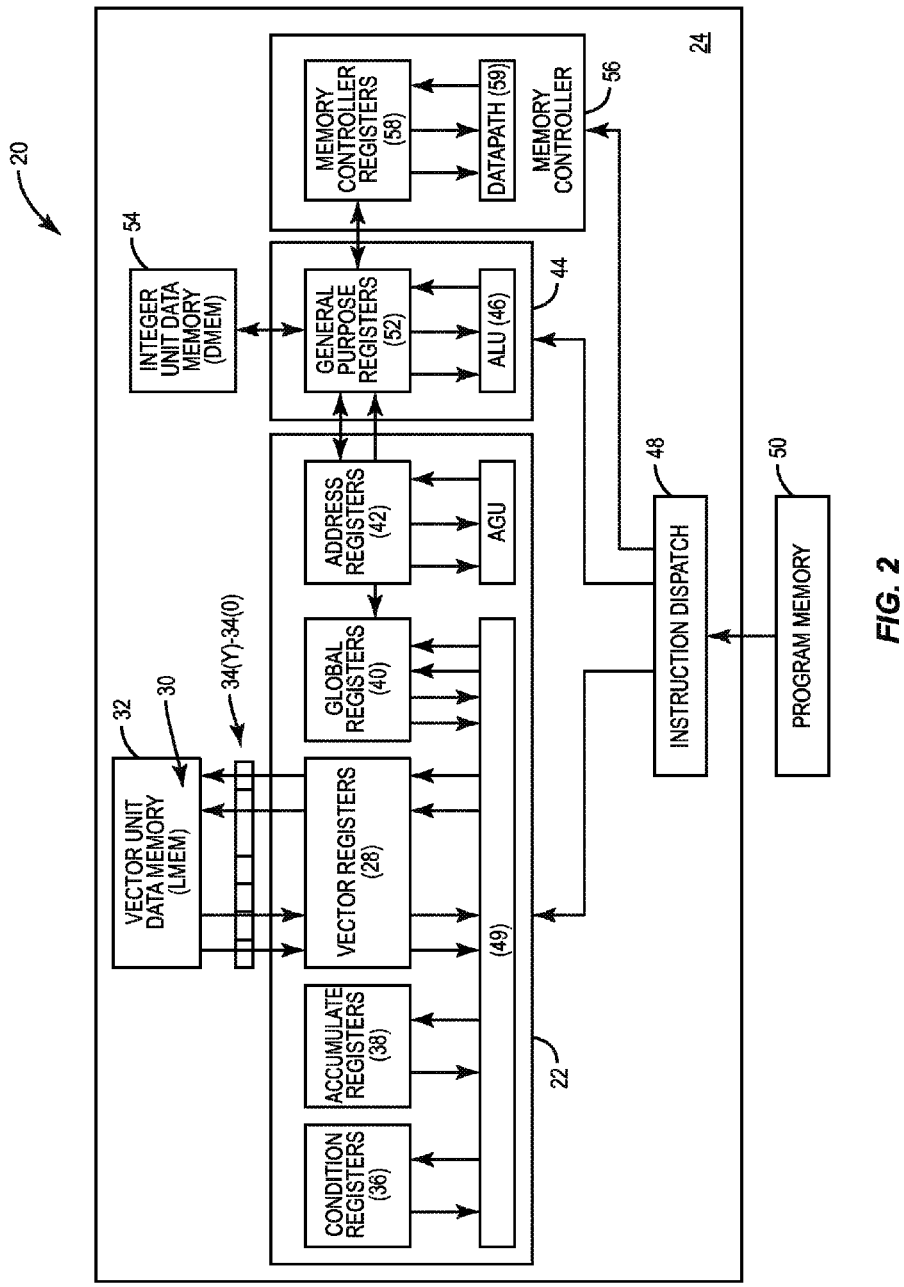
FIG. 2 is a schematic diagram of an exemplary vector processor that includes a common VPE having programmable data path configurations, so that common circuitry and hardware provided in the VPE can be programmed in multiple modes to perform specific types of vector operations in a highly efficient manner for multiple applications or technologies, without a need to provide separate VPEs.

In this regard, FIG. 2 is a schematic diagram of a baseband processor 20 that includes an exemplary vector processing unit 22, also referred to as a vector processing engine (VPE) 22. The baseband processor 20 and its VPE 22 can be provided in a semiconductor die 24. In this embodiment, as will be discussed in more detail below starting at FIG. 3, the baseband processor 20 includes a common VPE 22 that has programmable data path configurations. In this manner, the VPE 22 includes common circuitry and hardware that can be programmed and reprogrammed to provide different, specific types of vector operations in different operation modes without the requirement to provide separate VPEs in the baseband processor 20. The VPE 22 can also be programmed in a vector arithmetic mode for performing general arithmetic operations in a highly efficient manner for multiple applications or technologies, without the requirement to provide separate VPEs in the baseband processor 20.

Figure 3:
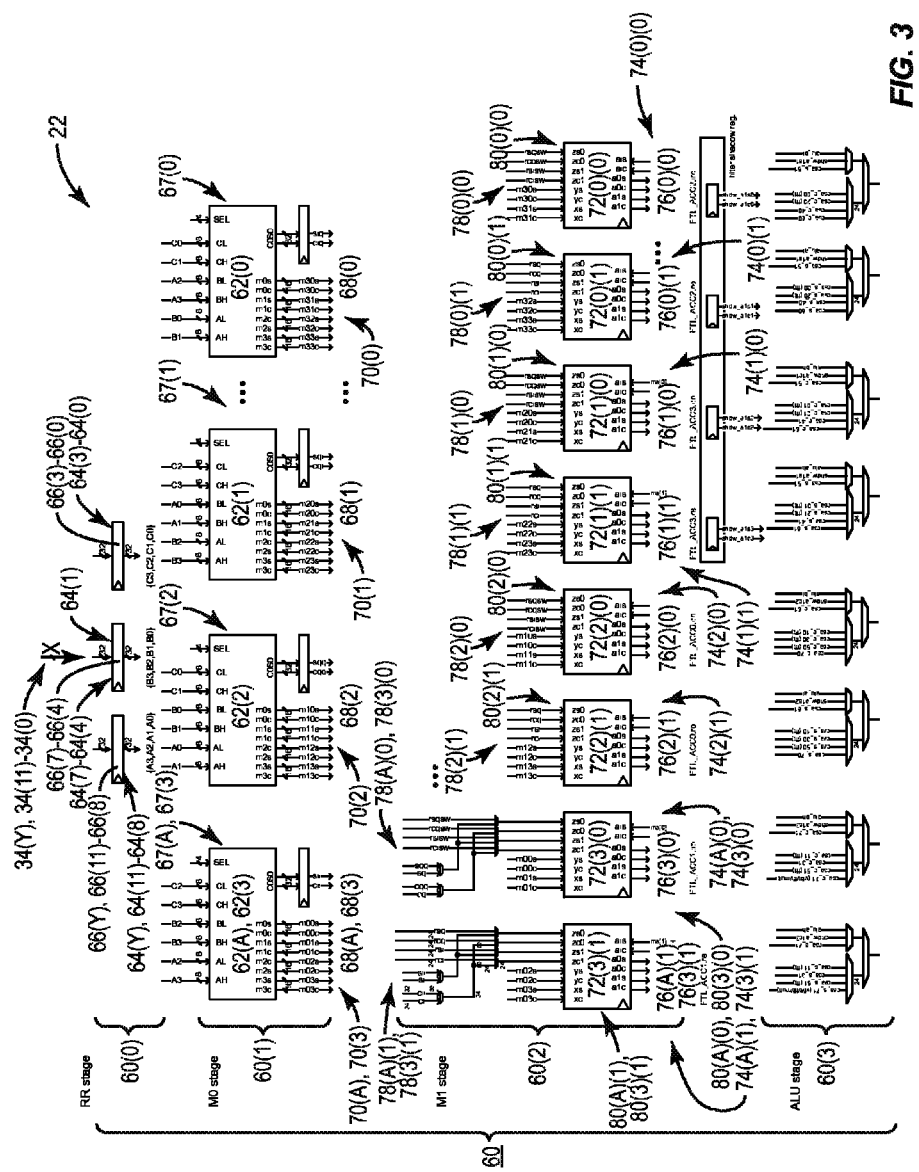
FIG. 3 is a schematic diagram of exemplary vector processing stages provided in the VPE of FIG. 2, wherein certain of the vector processing stages include exemplary vector processing blocks having programmable data path configurations.

Before discussing the programmable data path configurations provided in the VPE 22 for vector multi-mode processing starting with FIG. 3, the components of the baseband processor 20 in FIG. 2 are first described. The baseband processor 20 in this non-limiting example is a 512-bit vector processor. The baseband processor 20 includes additional components in addition to the VPE 22 to support the VPE 22 providing vector processing in the baseband processor 20. The baseband processor 20 includes vector registers 28 that are configured to receive and store vector data 30 from a vector unit data memory (LMEM) 32. For example, the vector data 30 is X bits wide, with 'X' defined according to design choice (e.g., 512 bits). The vector data 30 may be divided into vector data sample sets 34. For example, the vector data 30 may be 256-bits wide and may comprise smaller vector data sample sets 34(Y)-34(0), where some of the vector data sample sets 34(Y)-34(0) are 16-bits wide, and others of the vector data sample sets 34(Y)-34(0) are 32-bits wide. The VPE 22 is capable of providing vector processing on certain chosen multiply vector data sample sets 34(Y)-34(0) provided in parallel to the VPE 22 to achieve a high degree of parallelism. The vector registers 28 are also configured to store results generated when the VPE 22 processes the vector data 30. In certain embodiments, the VPE 22 is configured to not store intermediate vector processing results in the vector registers 28 to reduce register writes to provide faster vector instruction execution times. This configuration is opposed to scalar instructions executed by scalar processing engines that store intermediate results in registers, such as scalar processing DSPs.

The baseband processor 20 in FIG. 2 also includes condition registers 36 configured to provide conditions to the VPE 22 for use in conditional execution of vector instructions and to store updated conditions as a result of vector instruction execution. The baseband processor 20 also includes accumulate registers 38, global registers 40, and address registers 42. The accumulate registers 38 are configured to be used by the VPE 22 to store accumulated results as a result of executing certain specialized operations on the vector data 30. The global registers 40 are configured to store scalar operands for certain vector instructions supported by the VPE 22. The address registers 42 are configured to store addresses addressable by vector load and store instructions supported by the VPE 22 to retrieve the vector data 30 from the vector unit data memory 32 and store vector processing results in the vector unit data memory 32.

With continuing reference to FIG. 2, the baseband processor 20 in this embodiment also includes a scalar processor 44 (also referred to as "integer unit") to provide scalar processing in the baseband processor 20 in addition to vector processing provided by the VPE 22. It may be desired to provide a CPU configured to support both vector and scalar instruction operations based on the type of instruction executed for highly efficient operation. In this embodiment, the scalar processor 44 is a 32-bit reduced instruction set computing (RISC) scalar processor as a non-limiting example. The scalar processor 44 includes an arithmetic logic unit (ALU) 46 for supporting scalar instruction processing in this example. The baseband processor 20 includes an instruction dispatch circuit 48 configured to fetch instructions from program memory 50, decode the fetched instructions, and direct the fetched instructions to either the scalar processor 44 or through the vector datapath 49 to the VPE 22 based on instruction type. The scalar processor 44 includes general purpose registers 52 for use by the scalar processor 44 when executing scalar instructions. An integer unit data memory (DMEM) 54 is included in the baseband processor 20 to provide data from main memory into the general purpose registers 52 for access by the scalar processor 44 for scalar instruction execution. The DMEM 54 may be cache memory as a non-limiting example. The baseband processor 20 also includes a memory controller 56 that includes memory controller registers 58 configured to receive memory addresses from the general purpose registers 52 when the scalar processor 44 is executing vector instructions requiring access to main memory through memory controller data paths 59.

Figure 9A:
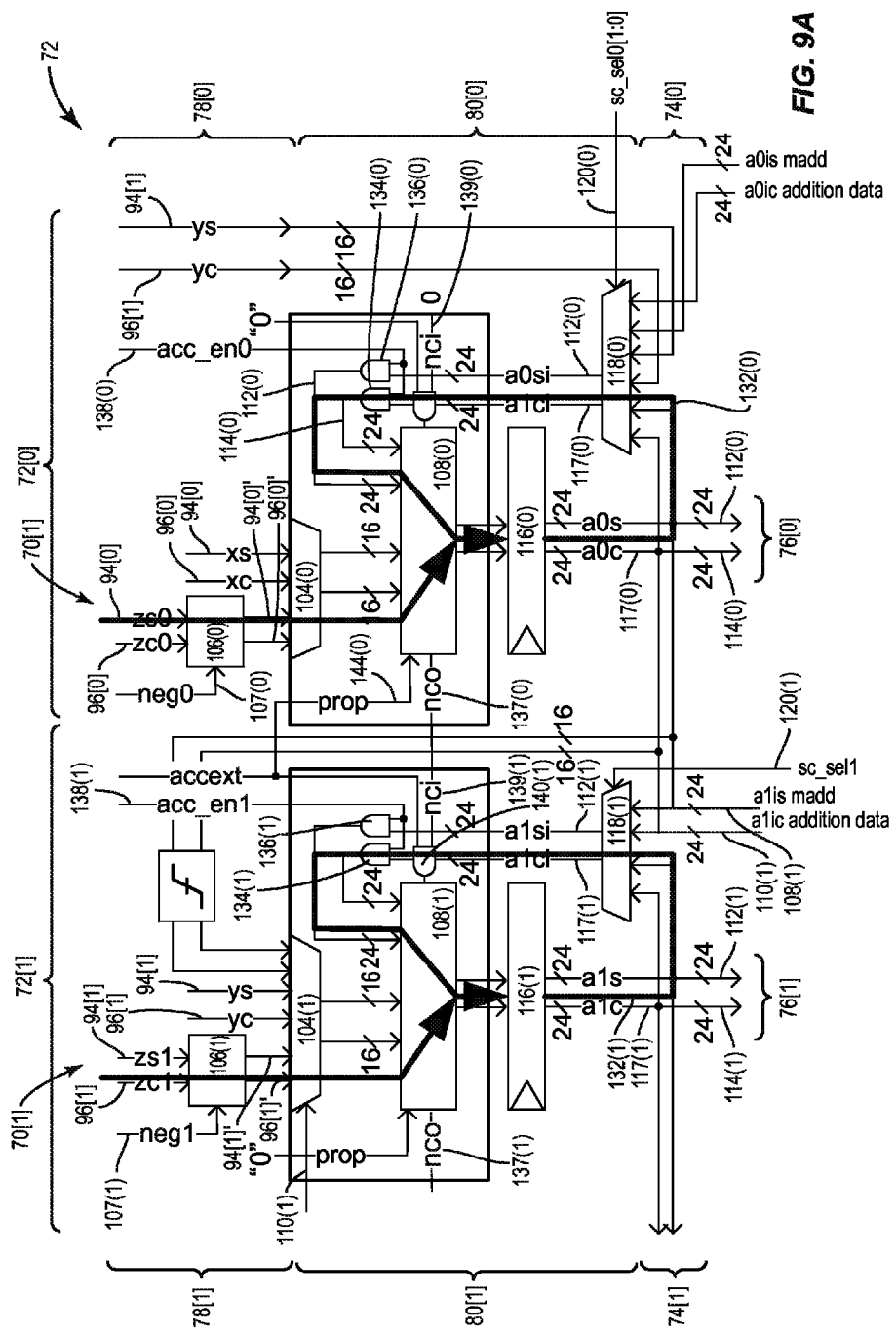
FIG. 9A is a schematic diagram of the accumulator block of FIG. 8 having data path configurations programmed for providing a dual 24-bit accumulator mode.
Figure 9B:
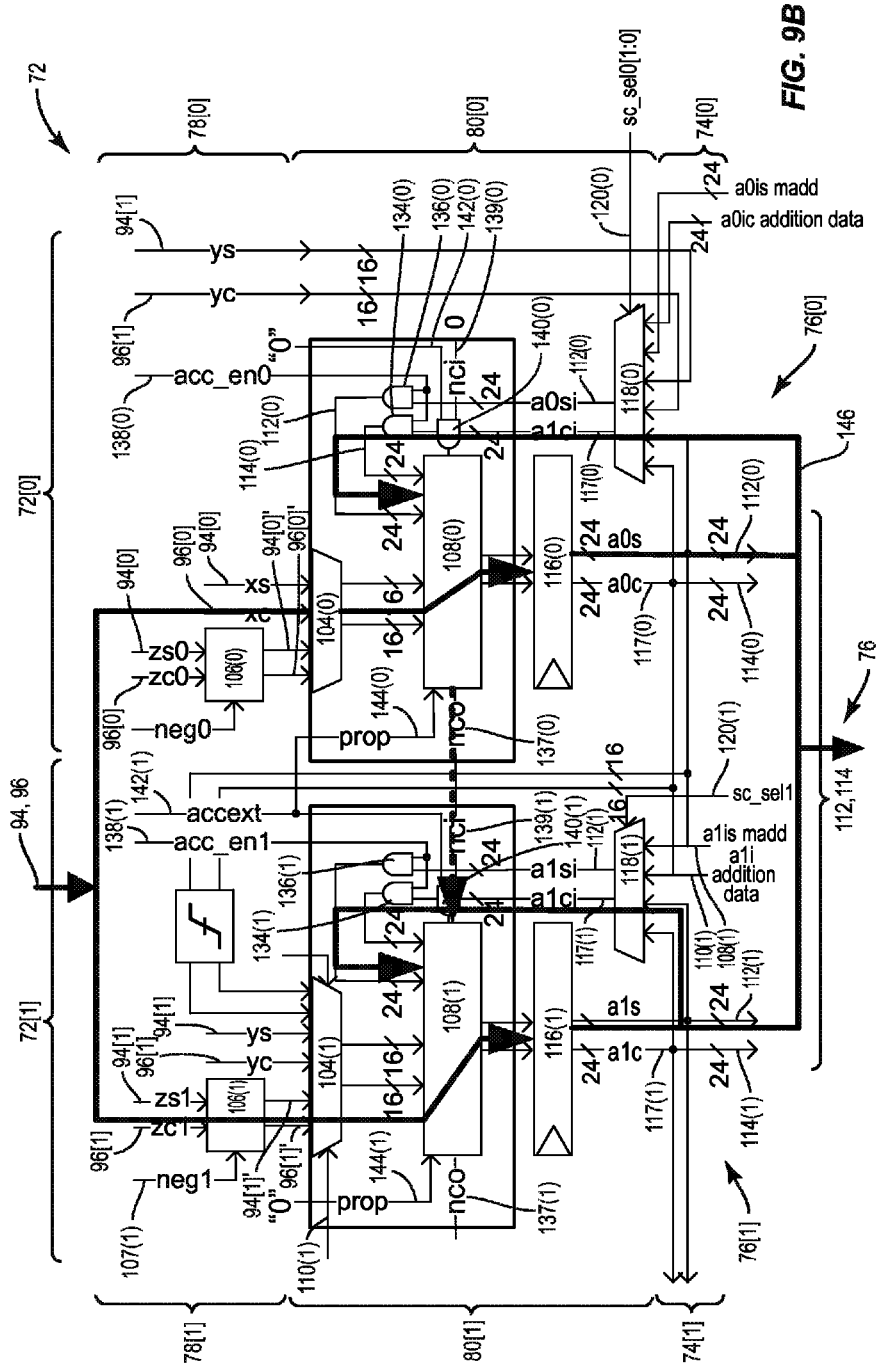
FIG. 9B is a schematic diagram of the accumulator block of FIG. 8 having data path configurations programmed for providing a single 40-bit accumulator mode.
Figure 10:
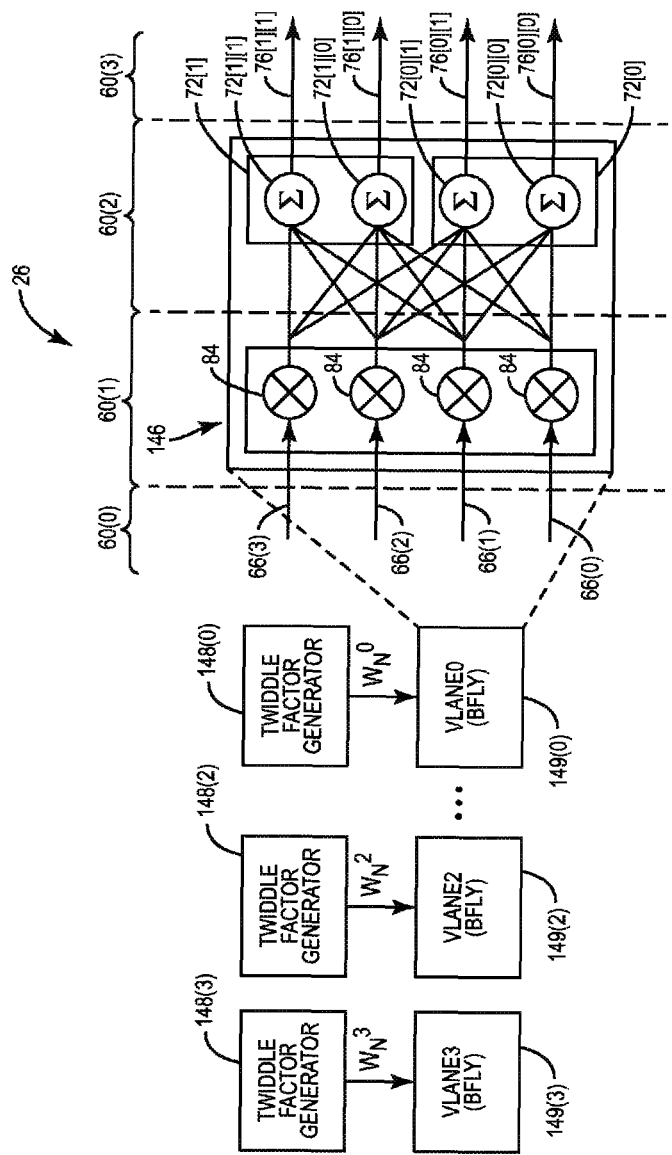
FIG. 10 is a conceptual schematic diagram of a multiplier having data path configurations programmed to be fused with four (4) accumulators in redundant carry-save format in the VPE of FIGS. 2 and 3 to form a Radix butterfly circuit configured to perform each cycle of a Radix-4 butterfly vector operation.
Figure 11:
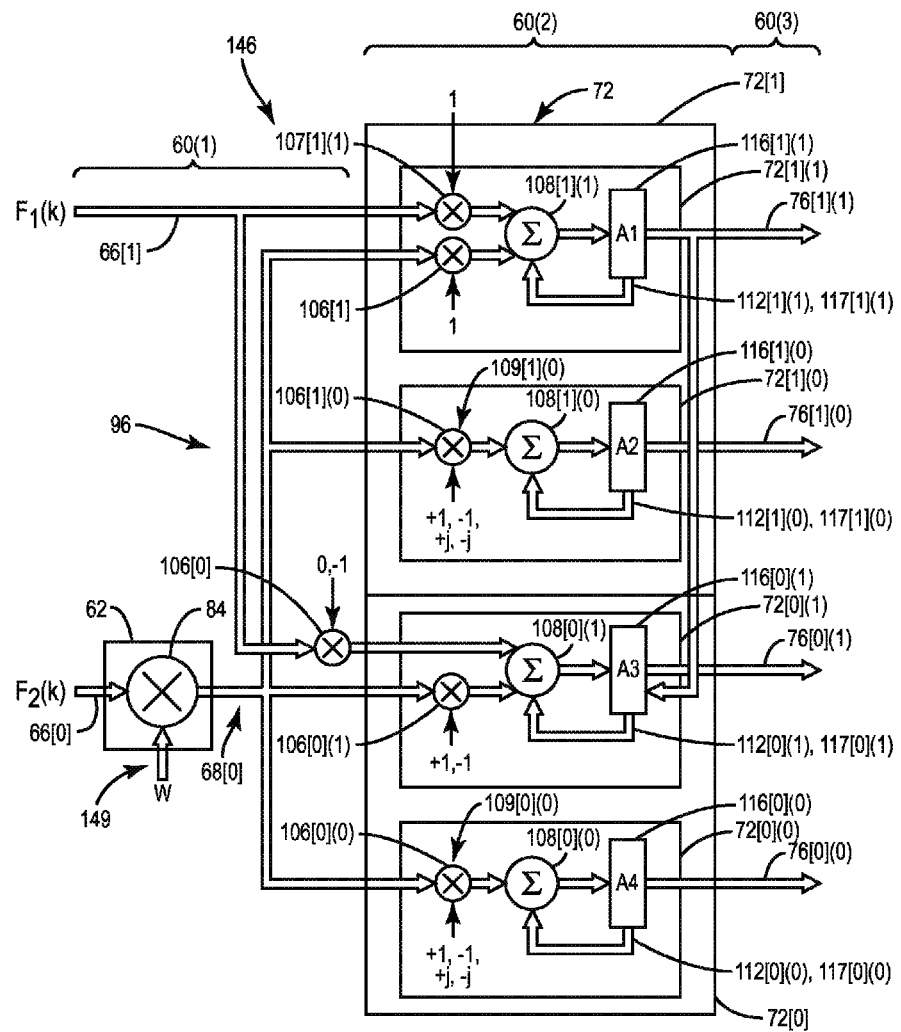
FIG. 11 is a schematic diagram of one cycle of the Radix butterfly circuit in FIG. 10 configured to perform either a Radix-2 or Radix-4 butterfly vector operation.

Now that the exemplary components of the baseband processor 20 in FIG. 2 have been described, more detail regarding the VPE 22 and its programmable data path configurations providing Radix-$2^X$ butterfly vector processing as well as other arithmetic logic vector operations with common circuitry and hardware are now discussed. FIGS. 3-8C, discussed in more detail below, include exemplary vector processing blocks included in the VPE 22 in FIG. 2 that have programmable data path configurations for providing multimode Radix-$2^X$ butterfly vector processing as well as other arithmetic logic vector operations. FIGS. 9-11, also discussed in more detail below, provide exemplary programmed data path configurations to fuse multiplier blocks with exemplary accumulator blocks to form a Radix butterfly circuit configured to perform each cycle of a Radix-$2^X$ butterfly operation.

In this regard, FIG. 3 illustrates an exemplary schematic diagram of the VPE 22 in FIG. 2. As illustrated in FIG. 3 and as will be described in more detail below in FIGS. 4-8C, the VPE 22 includes a plurality of exemplary vector processing stages 60 having exemplary vector processing blocks that may be configured with programmable data path configurations. As will be discussed in more detail below, the programmable data path configurations provided in the vector processing blocks allow specific circuits and hardware to be programmed and reprogrammed to support performing different, specific vector processing operations on the vector data 30 received from the vector unit data memory 32 in FIG. 2. For example, certain vector processing operations may commonly require multiplication of the vector data 30 followed by an accumulation of the multiplied vector data results. Non-limiting examples of such vector processing includes filtering operations, correlation operations, and Radix-2 and Radix-4 butterfly operations commonly used for performing Fast Fourier Transform (FFT) operations for wireless communications algorithms, where a series of parallel multiplications are provided followed by a series of parallel accumulations of the multiplication results. As will also be discussed in more detail below with regard to FIGS. 7-9C, the VPE 22 in FIG. 2 also has the option of fusing multipliers with carry-save accumulators to provide redundant carry-save format in the carry-save accumulators. Providing a redundant carry-save format in the carry-save accumulators can eliminate a need to provide a carry propagation path and a carry propagation add operation during each step of accumulation.

In this regard, with further reference to FIG. 3, a M0 multiply vector processing stage 60(1) of the VPE 22 will first be described. The M0 multiply vector processing stage 60(1) is a second vector processing stage containing a plurality of vector processing blocks in the form of any desired number of multiplier blocks 62(A)-62(0), each having programmable data path configurations. The multiplier blocks 62(A)-62(0) are provided to perform vector multiply operations in the VPE 22. The plurality of multiplier blocks 62(A)-62(0) are disposed in parallel to each other in the M0 multiply vector processing stage 60(1) for providing multiplication of up to twelve (12) multiply vector data sample sets 34(Y)-34(0). In this embodiment, 'A' is equal to three (3), meaning four (4) multiplier blocks 62(3)-62(0) are included in the M0 multiply vector processing stage 60(1) in this example. The multiply vector data sample sets 34(Y)-34(0) are loaded into the VPE 22 for vector processing into a plurality of latches 64(Y)-64(0) provided in an input read (RR) vector processing stage, which is a first vector processing stage 60(0) in the VPE 22. There are twelve (12) latches 64(11)-64(0) in the VPE 22 in this embodiment, meaning that 'Y' is equal to eleven (11) in this embodiment. The latches 64(11)-64(0) are configured to latch the multiply vector data sample sets 34(11)-34(0) retrieved from the vector registers 28 (see FIG. 2) as vector data input sample sets 66(11)-66(0). In this example, each latch 64(11)-64(0) is 8-bits wide. The latches 64(11)-64(0) are each respectively configured to latch the multiply vector data input sample sets 66(11)-66(0), for a total of 96-bits wide of vector data 30 (i.e., 12 latches×8 bits each).

With continuing reference to FIG. 3, the plurality of multiplier blocks 62(3)-62(0) are configured to be able to receive certain combinations of the vector data input sample sets 66(11)-66(0) for providing vector multiply operations, wherein 'Y' is equal to eleven (11) in this example. The multiply vector data input sample sets 66(11)-66(0) are provided in a plurality of input data paths A3-A0, B3-B0, and C3-C0 according to the design of the VPE 22. Vector data input sample sets 66(3)-66(0) correspond to input data paths C3-C0 as illustrated in FIG. 3. Vector data input sample sets 66(7)-66(4) correspond to input data paths B3-B0 as illustrated in FIG. 3. Vector data input sample sets 66(11)-66(8) correspond to input data paths A3-A0 as illustrated in FIG. 3. The plurality of multiplier blocks 62(3)-62(0) are configured to process the received vector data input sample sets 66(11)-66(0) according to the input data paths A3-A0, B3-B0, C3-C0, respectively, provided to the plurality of multiplier blocks 62(3)-62(0), to provide vector multiply operations.

As will be discussed in more detail below with regard to FIGS. 4 and 5, programmable internal data paths 67(3)-67(0) provided in the multiplier blocks 62(3)-62(0) in FIG. 3 can be programmed to have different data path configurations. These different data path configurations provide different combinations and/or different bit lengths of multiplication of particular received vector data input sample sets 66(11)-66(0) provided to the multiplier blocks 62(3)-62(0) according to the particular input data paths A3-A0, B3-B0, C3-C0, provided to each multiplier block 62(3)-62(0). In this regard, the plurality of multiplier blocks 62(3)-62(0) provide vector multiply output sample sets 68(3)-68(0) as a vector result output sample set comprising a multiplication result of multiplying a particular combination of the vector data input sample sets 66(11)-66(0) together.

For example, the programmable internal data paths 67(3)-67(0) of the multiplier blocks 62(3)-62(0) may be programmed according to settings provided from a vector instruction decoder in the instruction dispatch 48 of the baseband processor 20 in FIG. 2. In this embodiment, there are four (4) programmable internal data paths 67(3)-67(0) of the multiplier blocks 62(3)-62(0). The vector instruction specifies the specific type of operation to be performed by the VPE 22. Thus, the VPE 22 can be programmed and reprogrammed to configure the programmable internal data paths 67(3)-67(0) of the multiplier blocks 62(3)-62(0) to provide different types of vector multiply operations with the same common circuitry in a highly efficient manner. For example, the VPE 22 may be programmed to configure and reconfigure the programmable internal data paths 67(3)-67(0) of the multiplier blocks 62(3)-62(0) on a cycle-by-clock cycle basis for each vector instruction executed, according to decoding of the vector instructions in an instruction pipeline in the instruction dispatch 48. Thus, if the M0 multiply vector processing stage 60(1) in the VPE 22 is configured to process vector data input sample sets 66 every clock cycle, as a result, the multiplier blocks 62(3)-62(0) perform vector multiply operations on every clock cycle according to decoding of the vector instructions in an instruction pipeline in the instruction dispatch 48.

Figure 6:
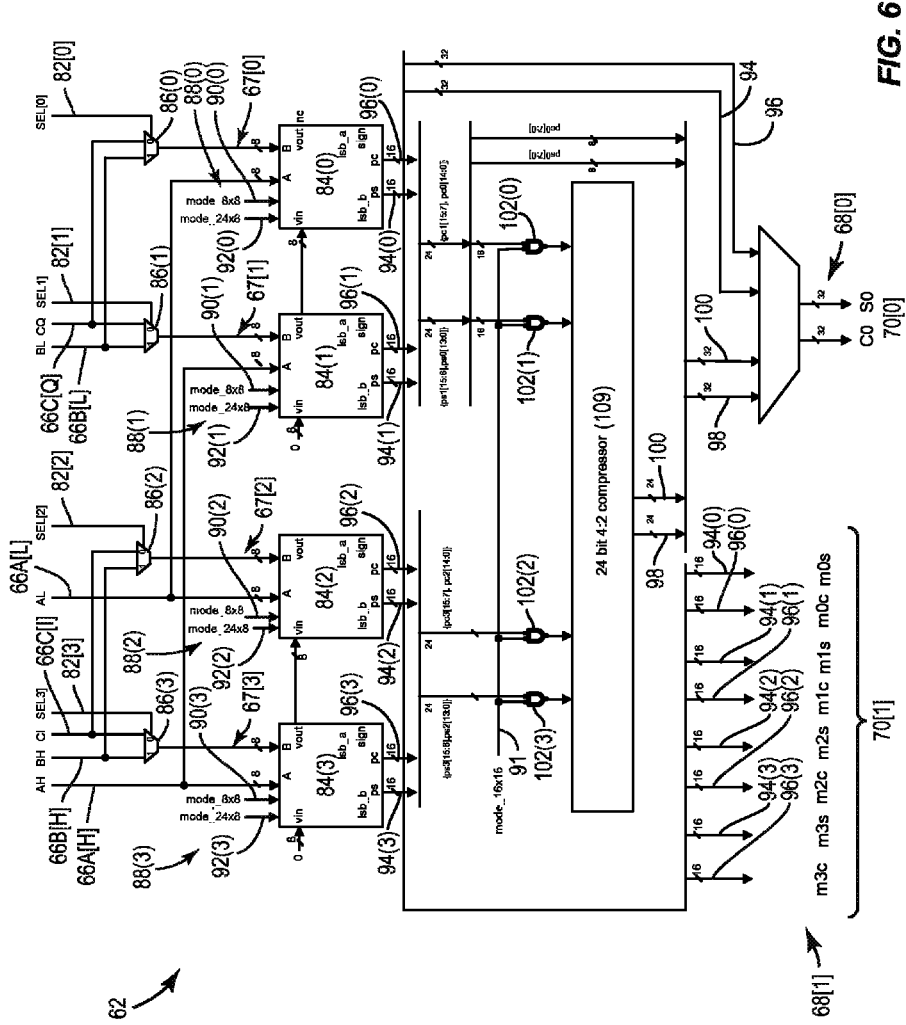
FIG. 6 is a schematic diagram of internal components of a multiplier block among the plurality of multiplier blocks in FIG. 5 having programmable data paths configurations capable of being programmed to provide multiply operations for 8-bit by 8-bit vector data input sample sets and 16-bit by 16-bit vector data input sample sets.

The multiplier blocks 62 can be programmed to perform real and complex multiplications. With continuing reference to FIG. 3, in one vector processing block data path configuration, a multiplier block 62 may be configured to multiply two 8-bit vector data input sample sets 66 together. In one multiply block data path configuration, a multiplier block 62 may be configured to multiply to two 16-bit vector data input sample sets 66 together, which are formed from a first pair of 8-bit vector data input sample sets 66 multiplied by a second pair of 8-bit vector data input sample sets 66. This is illustrated in FIG. 6 and discussed in more detail below. Again, providing the programmable data path configurations in the multiplier blocks 62(3)-62(0) provides flexibility in that the multiplier blocks 62(3)-62(0) can be configured and reconfigured to perform different types of multiply operations to reduce area in the VPE 22 and possible allow fewer VPEs 22 to be provided in the baseband processor 20 to carry out the desired vector processing operations.

With reference back to FIG. 3, the plurality of multiplier blocks 62(3)-62(0) are configured to provide the vector multiply output sample sets 68(3)-68(0) in programmable output data paths 70(3)-70(0) to either the next vector processing stage 60 or an output processing stage. The vector multiply output sample sets 68(3)-68(0) are provided in the programmable output data paths 70(3)-70(0) according to a programmed configuration based on the vector instruction being executed by the plurality of multiplier blocks 62(3)-62(0). In this example, the vector multiply output sample sets 68(3)-68(0) in the programmable output data paths 70(3)-70(0) are provided to the M1 accumulation vector processing stage 60(2) for accumulation, as will be discussed below. In this specific design of the VPE 22, it is desired to provide the plurality of multiplier blocks 62(3)-62(0) followed by accumulators to support specialized vector instructions that call for multiplications of vector data inputs followed by accumulation of the multiplied results. For example, Radix-2 and Radix-4 butterfly operations commonly used to provide FFT operations include a series of multiply operations followed by an accumulation of the multiplication results. However, note that these combinations of vector processing blocks provided in the VPE 22 are exemplary and not limiting. A VPE that has programmable data path configurations could be configured to include one or any other number of vector processing stages having vector processing blocks. The vector processing blocks could be provided to perform any type of operations according to the design and specific vector instructions designed to be supported by a VPE.

With continued reference to FIG. 3, in this embodiment, the vector multiply output sample sets 68(3)-68(0) are provided to a plurality of accumulator blocks 72(3)-72(0) provided in a next vector processing stage, which is the M1 accumulation vector processing stage 60(2). Each accumulator block among the plurality of accumulator blocks 72(A)-72(0) contains two accumulators 72(X)(1) and 72(X)(0) (i.e., 72(3)(1), 72(3)(0), 72(2)(1), 72(2)(0), 72(1)(1), 72(1)(0), and 72(0)(1), 72(0)(0)). The plurality of accumulator blocks 72(3)-72(0) accumulate the results of the vector multiply output sample sets 68(3)-68(0). As will be discussed in more detail below with regard to FIGS. 7-9C, the plurality of accumulator blocks 72(3)-72(0) can be provided as carry-save accumulators, wherein the carry product is in essence saved and not propagated during the accumulation process until the accumulation operation is completed. The plurality of accumulator blocks 72(3)-72(0) also have the option of being fused with the plurality of multiplier blocks 62(3)-62(0) in FIGS. 5 and 6 to provide redundant carry-save format in the plurality of accumulator blocks 72(3)-72(0). Providing redundant carry-save format in the plurality of accumulator blocks 72(3)-72(0) can eliminate a need to provide a carry propagation path and a carry propagation add operation during each step of accumulation in the plurality of accumulator blocks 72(3)-72(0). The M1 accumulation vector processing stage 60(2) and its plurality of accumulator blocks 72(3)-72(0) will now be introduced with reference to FIG. 3.

With reference to FIG. 3, the plurality of accumulator blocks 72(3)-72(0) in the M1 accumulation vector processing stage 60(2) are configured to accumulate the vector multiply output sample sets 68(3)-68(0) in programmable output data paths 74(3)-74(0) (i.e., 74(3)(1), 74(3)(0), 74(2)(1), 74(2)(0), 74(1)(1), 74(1)(0), and 74(0)(1), 74(0)(0)), according to programmable output data path configurations, to provide accumulator output sample sets 76(3)-76(0) (i.e., 76(3)(1), 76(3)(0), 76(2)(1), 76(2)(0), 76(1)(1), 76(1)(0), and 76(0)(1), 76(0)(0)) in either a next vector processing stage 60 or an output processing stage. In this example, the accumulator output sample sets 76(3)-76(0) are provided to an output processing stage, which is an ALU processing stage 60(3). For example, as discussed in more detail below, the accumulator output sample sets 76(3)-76(0) can also be provided to the ALU 46 in the scalar processor 44 in the baseband processor 20 in FIG. 2, as a non-limiting example. For example, the ALU 46 may take the accumulator output sample sets 76(3)-76(0) according to the specialized vector instructions executed by the VPE 22 to be used in more general processing operations.

With reference back to FIG. 3, programmable input data paths 78(3)-78(0) and/or programmable internal data paths 80(3)-80(0) of the accumulator blocks 72(3)-72(0) can be programmed to be reconfigured to receive different combinations and/or bit lengths of the vector multiply output sample sets 68(3)-68(0) provided from the multiplier blocks 62(3)-62(0) to the accumulator blocks 72(3)-72(0). Because each accumulator block 72 is comprised of two accumulators 72(X)(1), 72(X)(0), the programmable input data paths 78(A)-78(0) are shown in FIG. 3 as 78(3)(1), 78(3)(0), 78(2)(1), 78(2)(0), 78(1)(1), 78(1)(0), and 78(0)(1), 78(0)(0). Similarly, the programmable internal data paths 80(3)-80(A)

are shown in FIG. 3 as 80(3)(1), 80(3)(0), 80(2)(1), 80(2)(0), 80(1)(1), 80(1)(0), 80(0)(1), 80(0)(0). Providing programmable input data paths 78(3)-78(0) and/or programmable internal data paths 80(3)-80(0) in the accumulator blocks 72(3)-72(0) is discussed in more detail below with regard to FIGS. 8-9C. In this manner, according to the programmable input data paths 78(3)-78(0) and/or the programmable internal data paths 80(3)-80(0) of the accumulator blocks 72(3)-72(0), the accumulator blocks 72(3)-72(0) can provide the accumulator output sample sets 76(3)-76(0) according to the programmed combination of accumulated vector multiply output sample sets 68(3)-68(0). Again, this provides flexibility in that the accumulator blocks 72(3)-72(0) can be configured and reconfigured to perform different types of accumulation operations based on the programming of the programmable input data paths 78(3)-78(0) and/or the programmable internal data paths 80(3)-80(0) to reduce area in the VPE 22 and possibly allow fewer VPEs 22 to be provided in the baseband processor 20 to carry out the desired vector processing operations.

For example, in one accumulator mode configuration, the programmable input data path 78 and/or the programmable internal data paths 80 of two accumulator blocks 72 may be programmed to provide for a single 40-bit accumulator as a non-limiting example. This is illustrated in FIG. 9A and discussed in more detail below. In another accumulator mode configuration, the programmable input data path 78 and/or the programmable internal data path 80 of two accumulator blocks 72 may be programmed to provide for dual 24-bit accumulators as a non-limiting example. This is illustrated in FIG. 9B and discussed in more detail below. In another accumulator mode configuration, the programmable input data path 78 and/or the programmable internal data path 80 of two accumulator blocks 72 may be programmed to provide for a 16-bit carry-save adder followed by a single 24-bit accumulator. This is illustrated in FIG. 9C and discussed in more detail below. Specific, different combinations of multiplications and accumulation operations can also be supported by the VPE 22 according to the programming of the multiplier blocks 62(3)-62(0) and the accumulator blocks 72(3)-72(0) (e.g., 16-bit complex multiplication with 16-bit accumulation, and 32-bit complex multiplication with 16-bit accumulation).

Figure 4A:
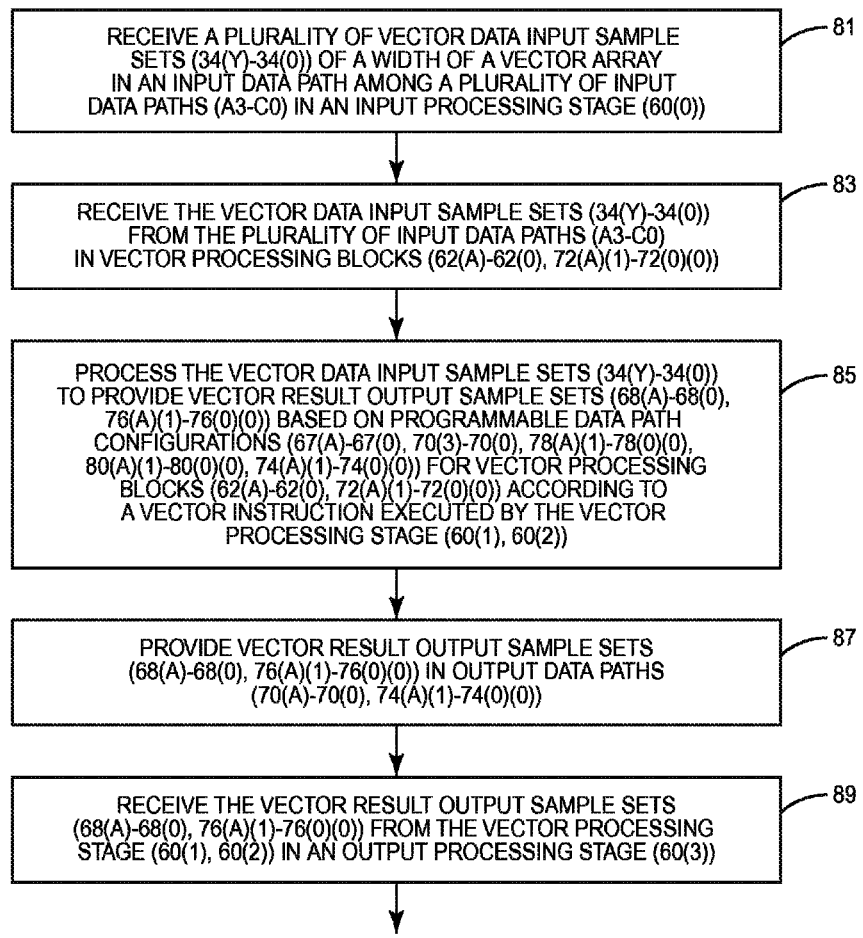
FIG. 4A is a flowchart illustrating exemplary vector processing of at least one vector processing block having programmable data path configurations included in the exemplary vector processor of FIGS. 2 and 3.
Figure 4B:
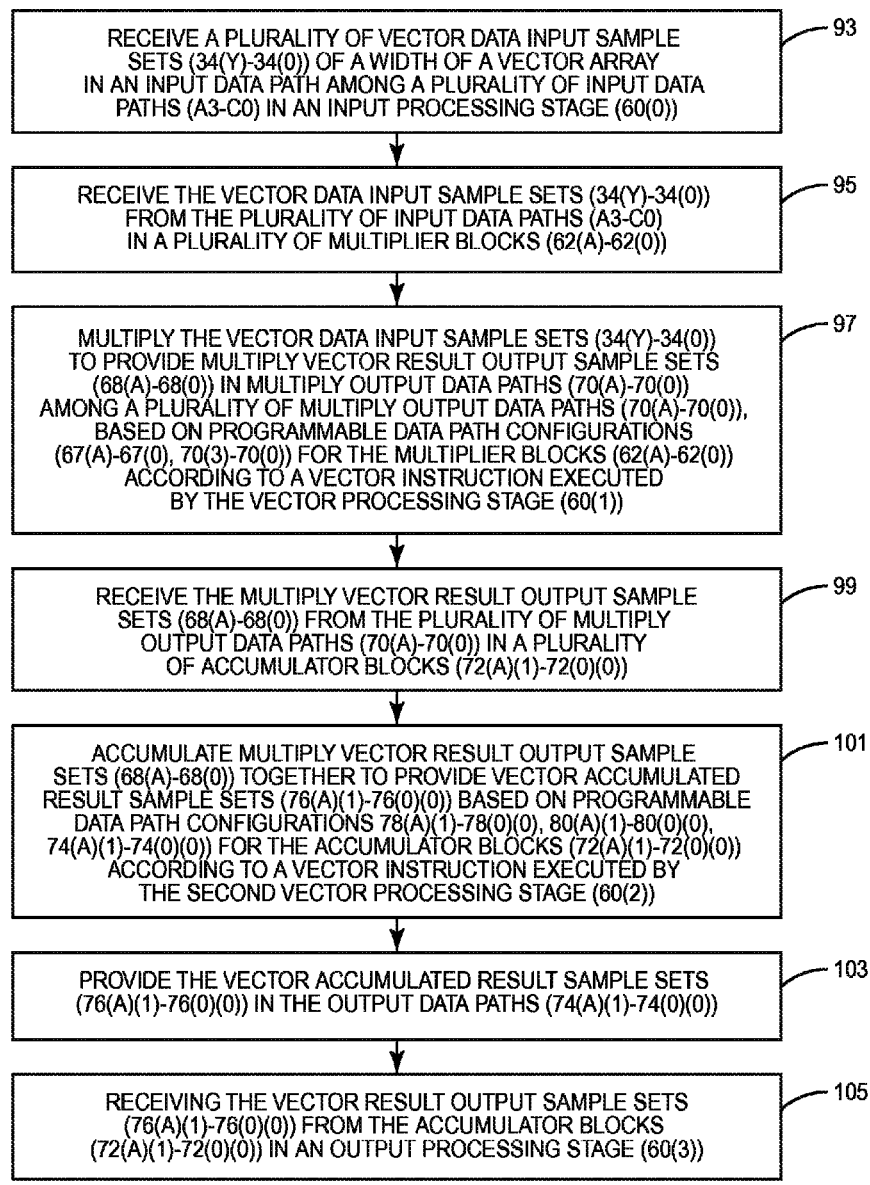
FIG. 4B is a flowchart illustrating exemplary vector processing of multiplier blocks and accumulator blocks, each having programmable data path configurations and provided in different vector processing stages in the exemplary vector processor of FIGS. 2 and 3.

The programmable input data paths 78(3)-78(0) and/or the programmable internal data paths 80(3)-80(0) of the accumulator blocks 72(3)-72(0) may be programmed according to settings provided from a vector instruction decoder in the instruction dispatch 48 of the baseband processor 20 in FIG. 2. The vector instruction specifies the specific type of operation to be performed by the VPE 22. Thus, the VPE 22 can be configured to reprogram the programmable input data paths 78(3)-78(0) and/or the programmable internal data paths 80(3)-80(0) of the accumulator blocks 72(3)-72(0) for each vector instruction executed according to decoding of the vector instruction in an instruction pipeline in the instruction dispatch 48. A vector instruction may execute over one or more clock cycles of the VPE 22. Also in this example, the VPE 22 can be configured to reprogram the programmable input data paths 78(3)-78(0) and/or the programmable internal data paths 80(3)-80(0) of the accumulator blocks 72(3)-72(0) for each clock cycle of a vector instruction on a clock cycle-by-clock cycle basis. Thus, for example, if a vector instruction executed by the M1 accumulation vector processing stage 60(2) in the VPE 22 processes the vector multiply output sample sets 68(3)-68(0) every clock cycle, as a result, the programmable input data paths 78(3)-78(0) and/or the programmable internal data paths 80(3)-80(0) of the accumulator blocks 72(3)-72(0) can be reconfigured each clock cycle during execution of the vector instruction. FIGS. 4A and 4B are flowcharts illustrating exemplary vector processing of the multiplier blocks 62(A)-62(0) and the accumulator blocks 72(A)(1)-72(0)(0) in the VPE 22 in FIGS. 2 and 3 to provide more illustration of the exemplary vector processing. FIG. 4A is a flowchart illustrating exemplary vector processing of a generalized vector processing block, which could be either the multiplier blocks 62(A)-62(0), the accumulator blocks 72(A)(1)-72(0)(0), or both, having programmable data path configurations included in the exemplary VPE of FIGS. 2 and 3. FIG. 4B is a flowchart illustrating exemplary vector processing of multiplier blocks 62(A)-62(0) and accumulator blocks 72(A)(1)-72(0)(0) each having programmable data path configurations and provided in different vector processing stages in the exemplary VPE 22 of FIGS. 2 and 3.

In this regard, as illustrated in FIG. 4A, the process of the VPE 22 includes receiving a plurality of vector data input sample sets 34(Y)-34(0) of a width of a vector array in an input data path among a plurality of input data paths (A3-C0) in an input processing stage 60(0) (block 81). The vector processing next comprises receiving the vector data input sample sets 34(Y)-34(0) from the plurality of input data paths A3-C0 in vector processing blocks 62(A)-62(0) and/or 72(A)(1)-72(0)(0) (block 83). The vector processing next includes processing the vector data input sample sets 34(Y)-34(0) to provide vector result output sample sets 68(A)-68(0), 76(A)(1)-76(0)(0) based on programmable data path configurations 67(A)-67(0), 70(3)-70(0), 78(A)(1)-78(0)(0), 80(A)(1)-80(0)(0), 74(A)(1)-74(0)(0) for vector processing blocks 62(A)-62(0), 72(A)(1)-72(0)(0) according to a vector instruction executed by the vector processing stage 60(1), 60(2) (block 85). The vector processing next includes providing the vector result output sample sets 68(A)-68(0), 76(A)(1)-76(0)(0) in output data paths 70(A)-70(0), 74(A)(1)-74(0)(0) (block 87). The vector processing next includes receiving the vector result output sample sets 68(A)-68(0), 76(A)(1)-76(0)(0) from the vector processing stage 60(1), 60(2) in an output processing stage 60(3) (block 89).

Note that each processing stage 60(0)-60(3) in the vector processing described above with regard to FIG. 4A occurs concurrently for parallelization vector processing, wherein the programmable data path configurations 67(A)-67(0), 70(3)-70(0), 78(A)(1)-78(0)(0), 80(A)(1)-80(0)(0), 74(A)(1)-74(0)(0) of the vector processing blocks 62(A)-62(0), 72(A)(1)-72(0)(0) can be reprogrammed as often as each clock cycle. As discussed above, this allows the vector processing blocks 62(A)-62(0), 72(A)(1)-72(0)(0) to perform different operations for different vector instructions efficiently, and through the use of common vector processing blocks 62(A)-62(0), 72(A)(1)-72(0)(0).

FIG. 4B is a flowchart illustrating exemplary vector processing of the multiplier blocks 62(A)-62(0) and accumulator blocks 72(A)(1)-72(0)(0) in the VPE 22 in FIG. 3 for vector instructions involving multiply operations followed by accumulate operations. For example, FFT vector operations involve multiply operations followed by accumulate operations. The flowchart of FIG. 4B provides further exemplary detail of the exemplary generalized vector processing of the VPE 22 described above in FIG. 4A. In this regard, the vector processing involves receiving a plurality of vector data input sample sets 34(Y)-34(0) of a width of a vector array in an input data path among a plurality of input data paths A3-C0 in an input processing stage 60(0) (block 93). The vector processing then includes receiving the vector data input sample sets 34(Y)-34(0) from the plurality of input data paths A3-C0 in a plurality of multiplier blocks 62(A)-62(0) (block 95). The vector processing then includes multiplying the vector data input sample sets 34(Y)-34(0) to provide multiply vector result output sample sets 68(A)-68(0) in multiply output data paths 70(A)-70(0) among a plurality of multiply output data paths 70(A)-70(0), based on programmable data path configurations 67(A)-67(0), 70(3)-70(0) for the multiplier blocks 62(A)-62(0) according to a vector instruction executed by the vector processing stage 60(1) (block 97). The vector processing next includes receiving the multiply vector result output sample sets 68(A)-68(0) from the plurality of multiply output data paths 70(A)-70(0) in a plurality of accumulator blocks 72(A)(1)-72(0)(0) (block 99). The vector processing next includes accumulating multiply vector result output sample sets 68(A)-68(0) together to provide vector accumulated result sample sets 76(A)(1)-76(0)(0) based on programmable data path 78(A)(1)-78(0)(0), 80(A)(1)-80(0)(0), 74(A)(1)-74(0)(0) configurations for the accumulator blocks 72(A)(1)-72(0)(0) according to a vector instruction executed by the second vector processing stage 60(2) (block 101). The vector processing then includes providing the vector accumulated result sample sets 76(A)(1)-76(0)(0) in the output data paths 74(A)(1)-74(0)(0) (block 103). The vector processing then includes receiving the vector result output sample sets 76(A)(1)-76(0)(0) from the accumulator blocks 72(A)(1)-72(0)(0) in an output processing stage 60(3) (block_105).

Now that the overview of the exemplary VPE 22 of FIG. 3 and vector processing in FIGS. 4A and 4B employing vector processing blocks having programmable data path configurations have been described, the remainder of the description describes more exemplary, non-limiting details of these vector processing blocks in FIGS. 5-9C.

Figure 5:
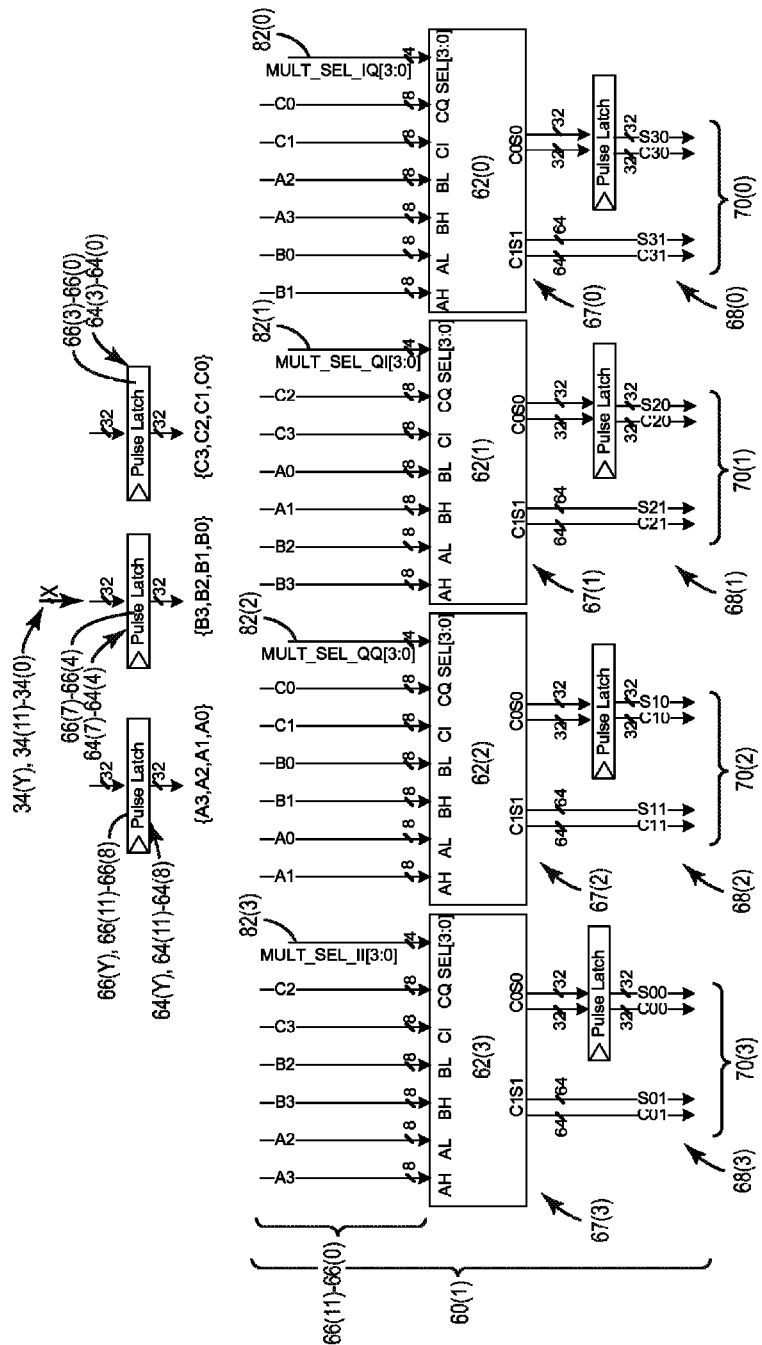
FIG. 5 is a more detailed schematic diagram of a plurality of multiplier blocks provided in a vector processing stage of the VPE of FIGS. 2 and 3, wherein the plurality of multiplier blocks each have programmable data path configurations, so that the plurality of multiplier blocks can be programmed in multiple modes to perform specific, different types of vector multiply operations.

In this regard, FIG. 5 is a more detailed schematic diagram of the plurality of multiplier blocks 62(3)-62(0) in the M0 multiply vector processing stage 60(1) of the VPE 22 of FIG. 3. FIG. 6 is a schematic diagram of internal components of a multiplier block 62 in FIG. 5. As illustrated in FIG. 5, the vector data input sample sets 66(11)-66(0) that are received by the multiplier blocks 62(3)-62(0) according to the particular input data paths A3-A0, B3-B0, C3-C0 are shown. As will be discussed in more detail below with regard to FIG. 6, each of the multiplier blocks 62(3)-62(0) in this example include four (4) 8-bit by 8-bit multipliers. With reference back to FIG. 5, each of the multiplier blocks 62(3)-62(0) in this example are configured to multiply A multiplicand input 'A' by either multiplicand input 'B' or multiplicand input 'C.' The multiplicand inputs 'A,' and 'B' or 'C' that can be multiplied together in a multiplier block 62 are controlled by which input data paths A3-A0, B3-B0, C3-C0 are connected to the multiplier blocks 62(3)-62(0), as shown in FIG. 5. A multiplicand selector input 82(3)-82(0) is provided as an input to each multiplier block 62(3)-62(0) to control the programmable internal data paths 67(3)-67(0) in each multiplier block 62(3)-62(0) to select whether multiplicand input 'B' or multiplicand input 'C' is selected to be multiplied by multiplicand input 'A.' In this manner, the multiplier blocks 62(3)-62(0) are provided with the capability for their programmable internal data paths 67(3)-67(0) to be reprogrammed to provide different multiply operations, as desired.

With continuing reference to FIG. 5, using multiplier block 62(3) as an example, input data paths A3 and A2 are connected to inputs AH and AL, respectively. Input AH represents the high bits of multiplicand input A, and AL means the low bits of input multiplicand input 'A.' Input data paths B3 and B2 are connected to inputs BH and BL, respectively. Input BH represents the high bits of multiplicand input 'B,' and AL represents the low bits of input multiplicand input 'B.' Input data paths C3 and C2 are connected to inputs CI and CQ, respectively. Input CI represents the real bits portion of input multiplicand input 'C' in this example. CQ represents the imaginary bits portion of input multiplicand input 'C' in this example. As will be discussed in more detail below with regard to FIG. 6, the multiplicand selector input 82(3) also controls whether the programmable internal data paths 67(3) of multiplier block 62(3) are configured to perform 8-bit multiplication on multiplicand input 'A' with multiplicand input 'B' or multiplicand input 'C,' or whether multiplier block 62(3) is configured to perform 16-bit multiplication on multiplicand input 'A' with multiplicand input 'B' or multiplicand input 'C' in this example.

With continuing reference to FIG. 5, the multiplier blocks 62(3)-62(0) are configured to each generate vector multiply output sample sets 68(3)-68(0) as carry 'C' and sum 'S' vector output sample sets of the multiplication operation based on the configuration of their programmable internal data paths 67(3)-67(0). As will be discussed in more detail below with regard to FIGS. 7-9C, the carry 'C' and sum 'S' of the vector multiply output sample sets 68(3)-68(0) are fused, meaning that the carry 'C' and the sum 'S' are provided in redundant carry-save format to the plurality of accumulators 72(3)-72(0) to provide redundant carry-save format in the plurality of accumulators 72(3)-72(0). As will be discussed in more detail below, providing a redundant carry-save format in the plurality of accumulators 72(3)-72(0) can eliminate a need to provide a carry propagation path and a carry propagation add operation during accumulation operations performed by the plurality of accumulators 72(3)-72(0).

Examples of the multiplier blocks 62(3)-62(0) generating the vector multiply output sample sets 68(3)-68(0) as carry 'C' and sum 'S' vector output sample sets of the multiplication operation based on the configuration of their programmable internal data paths 67(3)-67(0) are shown in FIG. 5. For example, multiplier block 62(3) is configured to generate carry C00 and sum S00 as 32-bit values for 8-bit multiplications and carry C01 and sum S01 as 64-bit values for 16-bit multiplications. The other multiplier blocks 62(2)-62(0) have the same capability in this example. In this regard, multiplier block 62(2) is configured to generate carry C10 and sum S10 as 32-bit values for 8-bit multiplications and carry C11 and sum S11 as 64-bit values for 16-bit multiplications. Multiplier block 62(1) is configured to generate carry C20 and sum S20 as 32-bit values for 8-bit multiplications and carry C21, and sum S21 as 64-bit values for 16-bit multiplications. Multiplier block 62(0) is configured to generate carry C30 and sum S30 as 32-bit values for 8-bit multiplications and carry C31 and sum S31 as 64-bit values for 16-bit multiplications.

To explain more exemplary detail of programmable data path configurations provided in a multiplier block 62 in FIG. 5, FIG. 6 is provided. FIG. 6 is a schematic diagram of internal components of a multiplier block 62 in FIGS. 3 and 5 having programmable data path configurations capable of multiplying 8-bit by 8-bit vector data input sample set 66, and 16-bit by 16-bit vector data input sample set 66. In this regard, the multiplier block 62 includes four 8×8-bit multipliers 84(3)-84(0) in this example. Any desired number of multipliers 84 could be provided. A first multiplier 84(3) is configured to receive 8-bit vector data input sample set 66A[H] (which is the high bits of input multiplicand input 'A') and multiply the vector data input sample set 66A[H] with either 8-bit vector data input sample set 66B[H] (which is the high bits of input multiplicand input 'B') or 8-bit vector data input sample set 66C[I] (which is the high bits of input multiplicand input 'C'). A multiplexor 86(3) is provided that is configured to select either 8-bit vector data input sample set 66B[H] or 8-bit vector data input sample set 66C[I] being providing as a multiplicand to the multiplier 84(3). The multiplexor 86(3) is controlled by multiplicand selector bit input 82[3], which is the high bit in the multiplicand selector input 82 in this embodiment. In this manner, the multiplexor 86(3) and the multiplicand selector bit input 82[3] provide a programmable internal data path 67[0] configuration for the multiplier 84(3) to control whether 8-bit vector data input sample set 66B[H] or 8-bit vector data input sample set 66C[I] is multiplied with receive vector data input sample set 66A[H].

With continuing reference to FIG. 6, the other multipliers 84(2)-84(0) also include similar programmable internal data paths 67[2]-67[0] as provided for the first multiplier 84(3). Multiplier 84(2) includes the programmable internal data path 67[2] having a programmable configuration to provide either 8-bit vector data input sample set 66B[H] or 8-bit vector data input sample set 66C[I] in the programmable internal data path 67[1] to be multiplied with 8-bit vector data input sample set 66A[L], which is the low bits of multiplicand input 'A.' The selection is controlled by multiplexor 86(2) according to the multiplicand selector bit input 82[2] in the multiplicand selector input 82 in this embodiment. Multiplier 84(1) includes programmable internal data path 67[1] programmable to provide either 8-bit vector data input sample set 66B[L], which is the low bits of multiplicand input 'B,' or 8-bit vector data input sample set 66C[Q], which is the low bits of multiplicand input 'C' in the programmable internal data path 67[1] to be multiplied with 8-bit vector data input sample set 66A[H]. The selection is controlled by multiplexor 86(1) according to the multiplicand selector bit input 82[1] in the multiplicand selector input 82 in this embodiment. Further, multiplier 84(0) includes programmable internal data path 67[0] programmable to provide either 8-bit vector data input sample set 66B[L] or 8-bit vector data input sample set 66C[Q] in the programmable internal data path 67[0], to be multiplied with 8-bit vector data input sample set 66A[L]. The selection is controlled by multiplexor 86(0) according to the multiplicand selector bit input 82[0] in the multiplicand selector input 82 in this embodiment.

With continuing reference to FIG. 6, as discussed above, the multipliers 84(3)-84(0) can be configured to perform different bit length multiplication operations. In this regard, each multiplier 84(3)-84(0) includes bit length multiply mode inputs 88(3)-88(0), respectively. In this example, each multiplier 84(3)-84(0) can be programmed in 8-bit by 8-bit mode according to the inputs that control the configuration of programmable data paths 90(3)-90(0), 91, and 92(3)-92(0), respectively. Each multiplier 84(3)-84(0) can also be programmed to provide part of a larger bit multiplication operation, including 16-bit by 16-bit mode and 24-bit by 8-bit mode, according to the inputs that control the configuration of programmable data paths 90(3)-90(0), 91, and 92(3)-92(0), respectively. For example, if each multiplier 84(3)-84(0) is configured in 8-bit by 8-bit multiply mode according to the configuration of the programmable data paths 90(3)-90(0), the plurality of multipliers 84(3)-84(0) as a unit can be configured to comprise two (2) individual 8-bit by 8-bit multipliers as part of the multiplier block 62. If each multiplier 84(3)-84(0) is configured in 16-bit by 16-bit multiply mode according to configuration of the programmable data path 91, the plurality of multipliers 84(3)-84(0) as a unit can be configured to comprise a single 16-bit by 16-bit multiplier as part of the multiplier block 62. If the multipliers 84(3)-84(0) are configured in 24-bit by 8-bit multiply mode according to configuration of the programmable data paths 92(3)-92(0), the plurality of multipliers 84(3)-84(0) as a unit can be configured to comprise one (1) 16-bit by 24-bit by 8-bit multiplier as part of the multiplier block 62.

With continuing reference to FIG. 6, the multipliers 84(3)-84(0) in this example are shown as being configured in 16-bit by 16-bit multiply mode. Sixteen (16)-bit input sums 94(3), 94(2) and input carries 96(3), 96(2) are generated by each multiplier 84(3), 84(2), respectively. Sixteen (16)-bit input sums 94(1), 94(0) and input carries 96(1), 96(0) are generated by each multiplier 84(1), 84(0), respectively. The 16-bit input sums 94(3), 94(2) and input carries 96(3), 96(2) are also provided to a 24-bit 4:2 compressor 109 along with 16-bit sums input 94(1), 94(0) and input carries 96(1), 96(0) to add the input sums 94(3)-94(0) and input carries 96(3)-96(0) together. The added input sums 94(3)-94(0) and input carries 96(3)-96(0) provide a single sum 98 and single carry 100 in 16-bit by 16-bit multiply mode when the programmable data path 91 is active and gated with the input sums 94(3)-94(0) and input carries 96(3)-96(0). The programmable data path 91 is gated by a first AND-based gate 102(3) with combined input sums 94(3), 94(2) as a 16-bit word, and by a second AND-based gate 102(2) with combined input carries 96(3), 96(2) as a 16-bit word to be provided to the 24-bit 4:2 compressor 109. The programmable data path 91 is also gated by a third AND-based gate 102(1) with combined input sums 94(1), 94(0) as a 16-bit word, and by a fourth AND-based gate 102(0) with combined input carries 96(1), 96(0) as a 16-bit word to be provided to the 24-bit 4:2 compressor 109. The programmable output data path 70[0] is provided with the vector multiply output sample set 68[0] as a compressed 32-bit sum S0 and 32-bit carry C0 partial product if the multiplier block 62 is configured in a 16-bit by 16-bit or 24-bit by 8-bit multiply mode.

The programmable output data path 70[1] configuration is provided as the 16-bit input sums 94(3)-94(0) and corresponding 16-bit input carries 96(3)-96(0) as partial products without compression, if the multipliers 84(3)-84(0) in the multiplier block 62 are configured in 8-bit by 8-bit multiply mode. The programmable output data path 70[1] is provided as the 16-bit input sums 94(3)-94(0) and corresponding 16-bit input carries 96(3)-96(0) as the vector multiply output sample sets 68[1] without compression if the multipliers 84(3)-84(0) in the multiplier block 62 are configured in 8-bit by 8-bit multiply mode. The vector multiply output sample sets 68[0], 68[1], depending on a multiplication mode of the multiplier block 62, are provided to the accumulator blocks 72(3)-72(0) for accumulation of sum and carry products according to the vector instruction being executed.

Figure 7:
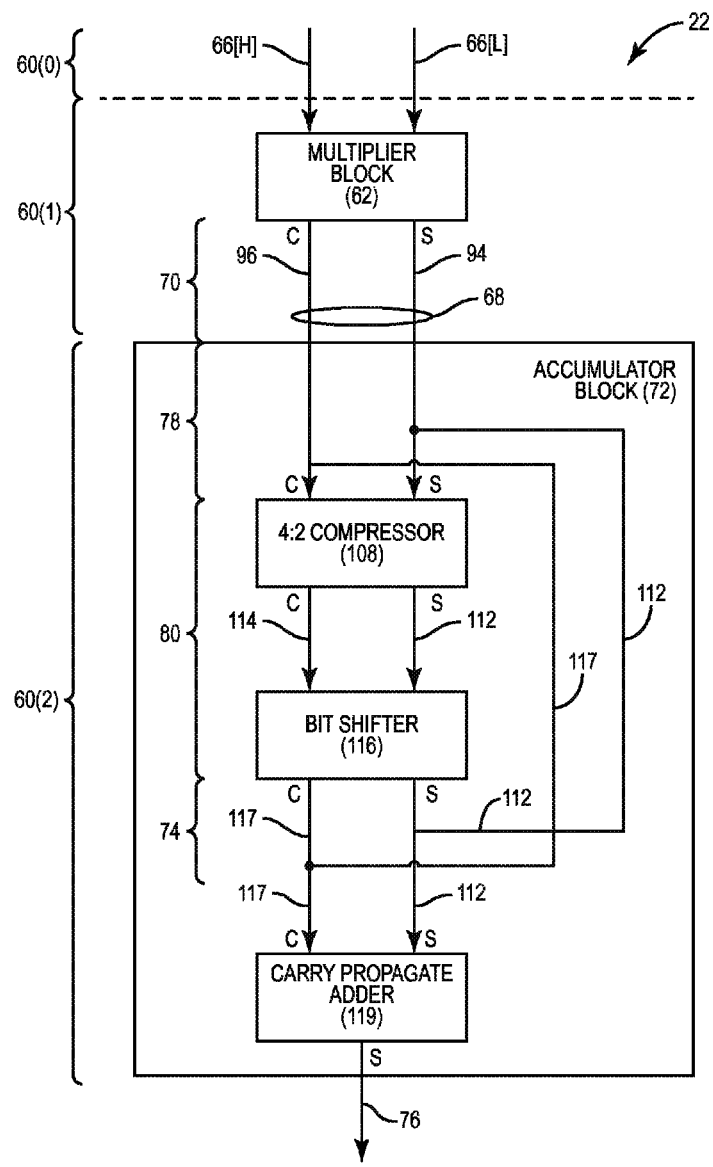
FIG. 7 is a generalized schematic diagram of a multiplier block and accumulator block in the VPE of FIGS. 2 and 3, wherein the accumulator block employs a carry-save accumulator structure employing redundant carry-save format to reduce carry propagation.

Now that the multiplier blocks 62(3)-62(0) in FIGS. 5 and 6 having programmable data path configurations have been described, features of the multiplier blocks 62(3)-62(0) in the VPE 22 to be fused with the accumulator blocks 72(3)-72(0) configured in redundant carry-save format will now described in general with regard to FIG. 7.

In this regard, FIG. 7 is a generalized schematic diagram of a multiplier block and accumulator block in the VPE of FIGS. 2 and 3, wherein the accumulator block employs a carry-save accumulator structure employing redundant carry-save format to reduce carry propagation. As previously discussed and illustrated in FIG. 7, the multiplier blocks 62 are configured to multiply multiplicand inputs 66[H] and 66[L] and provide at least one input sum 94 and at least one input carry 96 as a vector multiply output sample sets 68 in the programmable output data path 70. To eliminate the need to provide a carry propagation path and a carry propagation adder in the accumulator block 72 for each accumulation step, the at least one input sum 94 and the at least one input carry 96 in the vector multiply output sample sets 68 in the programmable output data path 70 are fused in redundant carry-save format to at least one accumulator block 72. In other words, the carry 96 in the vector multiply output sample sets 68 is provided as vector input carry 96 in carry-save format to the accumulator block 72. In this manner, the input sum 94 and the input carry 96 in the vector multiply output sample sets 68 can be provided to a compressor 108 of the accumulator block 72, which in this embodiment is a complex gate 4:2 compressor. The compressor 108 is configured to accumulate the input sum 94 and the input carry 96 together with a previous accumulated vector output sum 112 and a previous shifted accumulated vector output carry 117, respectively. The previous shifted accumulated vector output carry 117 is in essence the saved carry accumulation during the accumulation operation.

In this manner, only a single, final carry propagate adder is not required to be provided in the accumulator block 72 to propagate the received input carry 96 to the input sum 94 as part of the accumulation generated by the accumulator block 72. Power consumption associated with performing a carry propagation add operation during each step of accumulation in the accumulator block 72 is reduced in this embodiment. Also, gate delay associated with performing a carry propagation add operation during each step of accumulation in the accumulator block 72 is also eliminated in this embodiment.

With continuing reference to FIG. 7, the compressor 108 is configured to accumulate the input sum 94 and the input carry 96 in a redundant form with the previous accumulated vector output sum 112 and previous shifted accumulated vector output carry 117, respectively. The shifted accumulated vector output carry 117 is generated by an accumulated vector output carry 114 generated by the compressor 108 bit by shifting the accumulated vector output carry 114 before the next accumulation of the next received input sum 94 and input carry 96 is performed by the compressor 108. The final shifted accumulated vector output carry 117 is added to the final accumulated vector output sum 112 by a single, final carry propagate adder 119 provided in the accumulator block 72 propagate the carry accumulation in the final shifted accumulated vector output carry 117 to convert the final accumulated vector output sum 112 to the final accumulator output sample set 76 2's complement notation. The final accumulated vector output sum 112 is provided as accumulator output sample set 76 in the programmable output data path 74 (see FIG. 3).

Figure 8:
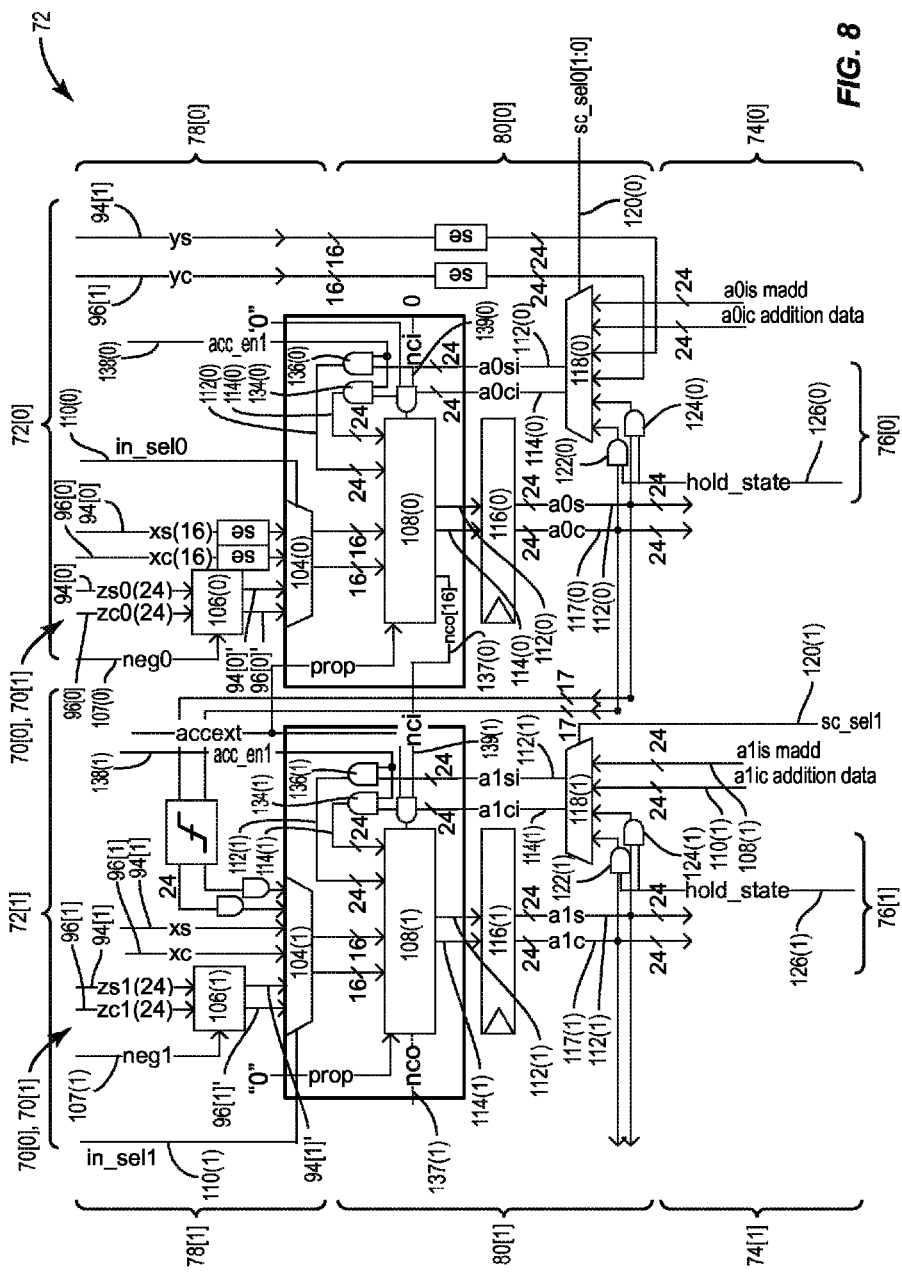
FIG. 8 is a detailed schematic diagram of exemplary internal components of the accumulator block of FIG. 7, which is provided in the VPE of FIGS. 2 and 3, wherein the accumulator block has programmable data path configurations, so that the accumulator block can be programmed in multiple modes to perform specific, different types of vector accumulate operations with redundant carry-save format.

Now that FIG. 7 illustrating the fusing of a multiplier blocks 62 with an accumulator block 72 configured in redundant carry-save format has been described, more exemplary detail regarding the accumulator blocks 72(3)-72(0) are now described in general with regard to FIG. 8. FIGS. 9A-9C described below provide more exemplary detail of the accumulator blocks 72(3)-72(0) configured in redundant carry-save format in different accumulation modes to provide different vector accumulation operations with common circuitry and hardware.

FIG. 8 is a detailed schematic diagram of exemplary internal components of an accumulator block 72 provided in the VPE 22 of FIG. 3. As previously discussed and discussed in more detail below, the accumulator block 72 is configured with programmable input data paths 78(3)-78(0) and/or the programmable internal data paths 80(3)-80(0), so that the accumulator block 72 can be programmed to act as dedicated circuitry designed to perform specific, different types of vector accumulation operations. For example, the accumulator block 72 can be programmed to provide a number of different accumulations and additions, including signed and unsigned accumulate operations. Specific examples of the programmable input data paths 78(3)-78(0) and/or programmable internal data paths 80(3)-80(0) in the accumulator block 72 being configured to provide different types of accumulation operations are illustrated in FIGS. 9A-9C discussed below.

Also, the accumulator block 72 is configured to include carry-save accumulators 72[0], 72[1] to provide redundant carry arithmetic to avoid or reduce carry propagation to provide high speed accumulation operations with reduced combinational logic.

Exemplary internal components of the accumulator block 72 are shown in FIG. 8. As illustrated therein, the accumulator block 72 in this embodiment is configured to receive a first input sum 94[0] and first input carry 96[0], and a second input sum 94[1] and second input carry 96[1] from a multiplier block 62 to be accumulated together. With regard to FIG. 8, the input sums 94[0], 94[1] and input carries 96[0], 96[1] will be referred to as vector input sums 94[0], 94[1] and vector input carries 96[0], 96[1]. As previously described and illustrated in FIG. 6, the vector input sums 94[0], 94[1] and vector input carries 96[0], 96[1] in this embodiment are each 16-bits in length. The accumulator block 72 in this example is provided as two 24-bit carry-save accumulators 72[0], 72[1], each containing similar components with common element numbers with '[0]' being designated for carry-save accumulator 72[0], and with '[1]' being designated for carry-save accumulator 72[1]. The carry-save accumulators 72[0], 72[1] can be configured to perform vector accumulation operations concurrently.

With reference to carry-save accumulator 72[0] in FIG. 8, the vector input sum 94[0] and vector input carry 96[0] are input in a multiplexor 104(0) provided as part of the programmable internal data path 80[0]. A negation circuit 106(0), which may be comprised of exclusive OR-based gates, is also provided that generates a negative vector input sum 94[0]' and negative vector input carry 96[0]' according to an input 107(0), as inputs into the multiplexor 104(0) for accumulation operations requiring a negative vector input sum 94[0]' and negative vector input carry 96[0]'. The multiplexor 104(0) is configured to select either vector input sum 94[0] and vector input carry 96[0] or the negative vector input sum 94[0]' and the negative vector input carry 96[0]' to be provided to a compressor 108(0) according to a selector input 110(0) generated as a result of the vector instruction decoding. In this regard, the selector input 110(0) allows the programmable input data path 78[0] of carry-save accumulator 72[0] to be programmable to provide either the vector input sum 94[0] and vector input carry 96[0], or the negative vector input sum 94[0]' and the negative vector input carry 96[0]', to the compressor 108(0) according to the accumulation operation configured to be performed by the accumulator block 72.

With continuing reference to FIG. 8, the compressor 108(0) of the carry-save accumulator 72[0] in this embodiment is a complex gate 4:2 compressor. In this regard, the compressor 108(0) is configured to accumulate sums and carries in redundant carry-save operations. The compressor 108(0) is configured to accumulate a current vector input sum 94[0] and vector input carry 96[0], or a current negative vector input sum 94[0]' and negative vector input carry 96[0]', together with previous accumulated vector input sum 94[0] and vector input carry 96[0], or accumulated negative vector input sum 94[0]' and negative vector input carry 96[0]', as the four (4) inputs to the compressor 108(0). The compressor 108(0) provides an accumulated vector output sum 112(0) and accumulated vector output carry 114(0) as the accumulator output sample set 76[0] in the programmable output data path 74[0] (see FIG. 3) to provide accumulator output sample sets 76(3)-76(0). The accumulated vector output carry 114(0) is shifted by a bit shifter 116(0) during accumulation operations to provide a shifted accumulated vector output carry 117(0) to control bit width growth during each accumulation step. For example, the bit shifter 116(0) in this embodiment is a barrelshifter that is fused to the compressor 108(0) in redundant carry-save format. In this manner, the shifted accumulated vector output carry 117(0) is in essence saved without having to be propagated to the accumulated vector output sum 112(0) during the accumulation operation performed by the accumulator 72[0]. In this manner, power consumption and gate delay associated with performing a carry propagation add operation during each step of accumulation in the accumulator 72[0] is eliminated in this embodiment.

Additional follow-on vector input sums 94[0] and vector input carries 96[0], or negative vector input sums 94[0]' and negative vector input carries 96[0]', can be accumulated with the current accumulated vector output sum 112(0) and current accumulated vector output carry 117(0). The vector input sums 94[0] and vector input carries 96[0], or negative vector input sums 94[0]' and negative vector input carries 96[0]', are selected by a multiplexor 118(0) as part of the programmable internal data path 80[0] according to a sum-carry selector 120(0) generated as a result of the vector instruction decoding. The current accumulated vector output sum 112(0) and current shifted accumulated vector output carry 117(0) can be provided as inputs to the compressor 108(0) for carry-save accumulator 72[0] to provide an updated accumulated vector output sum 112(0) and accumulated vector output carry 114(0). In this regard, the sum-carry selector 120(0) allows the programmable internal data path 80[0] of accumulator 72[0] to be programmable to provide the vector input sum 94[0] and vector input carry 96[0] to the compressor 108(0) according to the accumulation operation configured to be performed by the accumulator block 72. Hold gates 122(0), 124(0) are also provided in this embodiment to cause the multiplexor 118(0) to hold the current state of the accumulated vector output sum 112(0) and shifted accumulated vector output carry 117(0) according to a hold state input 126(0) to control operational timing of the accumulation in the carry-save accumulator 72[0].

With continuing reference to FIG. 8, the accumulated vector output sum 112(0) and shifted accumulated vector output carry 117(0) of carry-save accumulator 72[0], and the accumulated vector output sum 112(1) and shifted accumulated vector output carry 117(1) of carry-save accumulator 72[1], and are gated by control gates 134(0), 136(0) and 134(1), 136(1), respectively. The control gates 134(0), 136(0) and 134(1), 136(1) control the accumulated vector output sum 112(0) and shifted accumulated vector output carry 117(0), and the accumulated vector output sum 112(1) and shifted accumulated vector output carry 117(1), respectively, being returned to the compressors 108(0), 108(1).

In summary, with the programmable input data paths 78[0], 78[1] and programmable internal data paths 80[0], 80[1] of the accumulators 72[0], 72[1] of the accumulator block 72 in FIG. 8, the accumulator block 72 can be configured in different modes. The accumulator block 72 can be configured to provide different accumulation operations according to a specific vector processing instruction with common accumulator circuitry illustrated in FIG. 8. Examples of the accumulator block 72 being configured to provide different accumulation operations according to a specific vector processing instruction with common accumulator circuitry are illustrated in FIGS. 9A-9C below.

In this regard, FIG. 9A is a schematic diagram of the accumulator block 72 in FIG. 8. In this example, the accumulator block 72 has programmable input data paths 78[0], 78[1] and programmable internal data paths 80[0], 80[1] programmed to provide a dual 24-bit accumulator mode. Each carry-save accumulator 72[0], 72[1] in the accumulator block 72 in FIG. 9A is configured to provide a 24-bit accumulator.

The 24-bit accumulation capacities of the accumulators 72[0], 72[1] are provided by the bit capacity of the compressors 108(0), 108(1). The discussion of the accumulators 72[0], 72[1] with regard to FIG. 8 explains the individual 24-bit accumulations provided by accumulators 72[0], 72[1] in FIG. 9A. The general data path of accumulations performed by the by accumulators 72[0], 72[1] for providing dual 24-bit accumulations in the accumulation block 72 is shown in programmable accumulate data paths 132(0) and 132(1), respectively, in FIG. 9A.

With continuing reference to FIG. 9A, the exemplary components of carry-save accumulator 72[0] will be described, but are equally applicable to carry-save accumulator 72[1]. In this embodiment, the accumulated vector output sum 112(0) and shifted accumulated vector output carry 117(0) of carry-save accumulator 72[0], and the accumulated vector output sum 112(1) and shifted accumulated vector output carry 117(1) of carry-save accumulator 72[1], and are gated by the control gates 134(0), 136(0) and 134(1), 136(1), respectively. The control gates 134(0), 136(0) and 134(1), 136(1) control the accumulated vector output sum 112(0) and shifted accumulated vector output carry 117(0), and the accumulated vector output sum 112(1) and shifted accumulated vector output carry 117(1), respectively, being returned to the compressors 108(0), 108(1). Control inputs 138(0), 138(1) provided from decoding of vector instructions to both control gates 134(0), 136(0) and 134(1), 136(1), respectively, control the accumulated vector output sum 112(0) and shifted accumulated vector output carry 117(0), and the accumulated vector output sum 112(1) and shifted accumulated vector output carry 117(1), respectively, are returned to the compressors 108(0), 108(1). The control inputs 138(0), 138(1) and control gates 134(0), 136(0) control whether the accumulators 72[0], 72[1] are programmed to each perform separate accumulation operations or combined accumulation operations, as will be discussed in more detail below with regard to FIGS. 9B and 9C. Thus, the control inputs 138(0), 138(1) and the control gates 134(0), 136(0) and 134(1), 136(1) form part of the programmable internal data paths 80[0], 80[1] of the accumulators 72[0], 72[1], respectively, in this embodiment.

With reference back to FIG. 8, the programmable internal data paths 80[0], 80[1] of the accumulator block 72 can also be programmed and/or reprogrammed to perform accumulate operations greater than the 24-bit capacity of the individual accumulators 72[0], 72[1]. In this regard, the programmable internal data paths 80[0], 80[1] of the accumulators 72[0], 72[1] can be programmed to provide for both accumulators 72[0], 72[1] to be employed together in a single vector accumulation operation. The accumulators 72[0], 72[1] can be programmed to provide a single accumulation operation of greater bit capacity than the individual bit accumulation capacities of the accumulators 72[0], 72[1]. The programmable internal data paths 80[0], 80[1] of the accumulators 72[0], 72[1] can be configured to allow carry-save accumulator 72[0] to propagate an overflow carry output as a next carry output (NCO) 137(0) from compressor 108(0). The NCO 137(0) can be provided as a next carry input (NCI) 139(1) to compressor 108(1) in carry-save accumulator 72[1]. This carry propagation configuration capability provided as programmable internal data paths 80[0], 80[1] in the accumulators 72[0], 72[1] to allow the accumulators 72[0], 72[0] to provide 24-bit overflow carry propagation to 24-bit carry and sum accumulations, as previously described with regard to FIG. 8, to provide 40-bit accumulation in this embodiment.

In this regard, FIG. 9B is a schematic diagram of the same accumulator block 72 in FIG. 8. In FIG. 9B, the accumulator block 72 is shown configured in a single accumulation operation mode. In FIG. 9B, the accumulators 72[0], 72[1] have programmable internal data paths 80[0], 80[1] configured for providing a single accumulation operation in the accumulator block 72. In this example of a single accumulator mode of accumulator block 72, the accumulators 72[0], 72[1] accumulate a single 40-bit accumulated vector output sum 112 and shifted accumulated vector output carry 117. The single accumulated vector output sum 112 is comprised of the accumulated vector output sums 112(0), 112(1) provided as an accumulator output sample set 76 in programmable output data paths 74[0], 74[1] (see also, FIG. 3). The accumulated vector output sum 112(0) comprises the least significant bits of the single 40-bit accumulated vector output sum 112. The accumulated vector output sum 112(1) comprises the most significant bits of the single 40-bit accumulated vector output sum 112. Similarly, the shifted accumulated vector output carry 117 is comprised of the shifted accumulated output carries 117(0), 117(1). The shifted accumulated vector output carry 117(0) comprises the least significant bits of the single shifted accumulated vector output carry 117. The accumulated vector output sum 114(1) comprises the most significant bits of the single 40-bit accumulated vector output carry 114. The accumulate vector output sum 114[0] and shifted accumulated vector output carry 117(0) are provided in programmable output data path 74[0] (see FIG. 3).

With continuing reference to FIG. 9B, the general data path of accumulation operations performed by accumulators 72[0], 72[1] when the accumulator block 72 is configured in a single accumulation mode (e.g., 40-bit accumulation) is shown as programmable accumulate data path 146. In this regard, the accumulator block 72 receives the vector input sum 94 and vector input carry 96 as previously described. The carry-save accumulator 72[0] accumulates the least significant bits of accumulated vector output sum 112(0) and accumulated vector output carry 114(0) from accumulations of the vector input sums 94[0] and vector input carries 96[0], or negative vector input sums 94[0]' and negative vector input carries 96[0]'s, as the case may be. The carry-save accumulator 72[1] accumulates the most significant bits of the accumulated vector output sum 112(1) and accumulated vector output carry 114(1) from accumulations of the vector input sums 94[0] and vector input carries 96[0], or negative vector input sums 94[0]' and negative vector input carries 96[0]'s, as the case may be.

With continuing reference to FIG. 9B, to program the accumulators 72[0], 72[1] to provide the single accumulated vector output sum 112 and accumulated vector output carry 114, the programmable internal data paths 80[0], 80[1] of accumulators 72[0], 72[1] are programmed to provide a single accumulation operation. In this regard, the NCO 137(0) of compressor 108(0) of carry-save accumulator 72[0] and the NCI 139(1) of compressor 108(1) of carry-save accumulator 72[1] are configured for providing a single accumulator (e.g., 40-bit accumulator) in the accumulator block 72. The NCI 139(1) of the carry-save accumulator 72[1] is gated by NCI gate 140(1) with NCI control input 142(1). In this manner, when it is desired for the accumulators 72[0], 72[1] in the accumulator block 72 to provide a single accumulation operation employing overflow carry propagation from carry-save accumulator 72[0] to carry-save accumulator 72[1], the NCI control input 142(1) can be made active as part of the programmable internal data path 80[1] of the carry-save accumulator 72[1]. The NCI control input 142(1) causes the NCI gate 140(1) to allow an overflow carry propagation from the compressor 108(0) to compressor 108(1). The NCI control input 142(1) is also coupled to a carry propagate input 144(0) of the compressor 108(0) in carry-save accumulator 72[0] to cause the compressor 108(0) to generate the NCO 137(0) as NCI 139(1) to compressor 108(1). These configurations allow the carry-save accumulator 72[1] to accumulate vector input sums 94[1] and vector input carries 96[1] in a manner that can provide a single accumulated vector output sum 112 and accumulated vector output carry 114.

Note that carry-save accumulator 72[1] in the accumulator block 72 also includes a NCI gate 140(0) gated by NCI 139(0) and NCI control input 142(0), as shown in FIG. 9B. However, both NCI control input 142(0) and NCI 139(0) are tied to logical '0' in this embodiment since carry-save accumulator 72[0] accumulates the least significant bits of the single accumulation operation. Also note that compressor 108(0) of carry-save accumulator 72[1] also includes a carry propagate input 144(1), but the carry propagate input 144(1) is tied to logical '0' in this embodiment to cause the accumulator 72(1) to not generate the NCO 12(1). The carry-save accumulator 72[1] does not need to perform carry propagation to a next accumulator in this embodiment, since there is not another accumulator beyond carry-save accumulator 72[1] provided in this embodiment of the accumulator block 72.

FIG. 9C is a schematic diagram of another accumulator mode of the same accumulator block 72 in FIG. 8. In this regard, FIG. 9C is a schematic diagram of the accumulator block 72 in FIG. 8 having programmed data path configurations to provide a carry-save adder followed by a single accumulator to provide another accumulation mode in the accumulator block 72. Some accumulation operations may require an extra adder to perform complex arithmetic. In FIG. 9C, the accumulators 72[0], 72[1] have programmable internal data paths 80[0], 80[1] configured for providing a 16-bit carry-save adder followed by a single 24-bit accumulator.

With reference to FIG. 9C, the general data path of accumulations performed by accumulators 72[0], 72[1] when the accumulator block 72 is configured in carry-save adder followed by a single accumulator is shown by programmable data path 148. In this regard, the sum-carry selector 120(0) is generated as a result of the vector instruction decoding to cause the multiplexor 118(0) to provide the vector input sum 94[1] and vector input carry 96[0] to the control gates 134(0), 136(0). The control input 138(0) is made active to program the programmable internal data path 80[1] of carry-save accumulator 72[0] to cause the control gates 134(0), 136(0) to provide the vector input sum 94[1] and vector input carry 96[1] to the compressor 108(0). The vector input sum 94[1] and vector input carry 96[1] are accumulated with the vector input sum 94[0] and vector input carry 96[1] by the compressor 108(0) of the carry-save accumulator 72[0] to provide the accumulated vector output sum 112(0) and accumulated vector output carry 114(0). The accumulated vector output sum 112(0) and shifted accumulated vector output carry 117(0) are provided as the accumulator output sample set 76[0] in programmable output data path 74[0] (see also, FIG. 3) to provide a carry-save adder. The shifted accumulated vector output carry 117(0) is also provided to carry-save accumulator 72[1] as shown in programmable data path 148 to be provided by multiplexor 104(1) to compressor 108(1) to be accumulated to vector input sum 94[1] and vector input carry 96[1] to provide accumulated vector output sum 112(1) and shifted accumulated vector output carry 117(1) as accumulator output sample set 76[1] in programmable output data path 74[1] (see also, FIG. 3) as a 24-bit accumulator.

The multiplier blocks 62(0-A) and accumulator blocks 72(0-A) provided in the VPE 22, as described above in FIGS. 5-9C, can also be conveniently programmed to provide Radix-$2^X$ butterfly vector operations. Radix-$2^X$ butterfly vector operations can be used to perform FFT vector processing operations. FFT operations are commonly performed in various digital signal processing applications, such as linear filtering, correlation analysis, and spectrum analysis as examples. Thus, it can be advantageous to provide VPEs that can perform FFT vector processing operations in reduced processing times and in a power efficient manner.

As is known, a Discrete FFT (DFT) can be computed by computing the sequences {X(k)} of N complex-valued numbers given another sequence of data {x(n)} of length N, according to the formula:

$$X(k) = \sum_{n=0}^{N-1} x(n) W_N^{kn},$$

$$0 \leq k \leq N-1$$

$$W_N = e^{-j2\pi/N}$$

It is observed from the formula for X(k) above that for each value of k, direct computation of X(k) involves N complex multiplications (4N real multiplications) and N−1 complex additions (4N−2 real additions). Consequently, to compute all N values of the DFT requires $N^2$ complex multiplications and $N^2 - N$ complex additions. By recognizing the symmetry and periodicity properties of the phase factor $W_N$ shown below, a divide and conquer approach can be employed to compute a $N=2^X$ point DFT.

Symmetry property: $W_N^{k+N/2} = -W_N^k$;

Periodicity property: $W_N^{k+N} = W_N^k$

The N-point data sequence is divided into two N/2-point data sequences $f_1(n)$ and $f_2(n)$, corresponding to the even-numbered and odd-numbered samples of x(n), respectively, that is:

$$f_1(n) = x(2n)$$

$$f_2(n) = x(2n+1),$$

$$n = 0, 1, \ldots, N/2 - 1$$

or $$X(k) = \sum_{n=0}^{N-1} x(n) W_N^{kn}, k = 0, 1, \ldots, N-1$$

$$= \sum_{n \text{ even}} x(n) W_N^{kn} + \sum_{n \text{ odd}} x(n) W_N^{kn}$$

$$= \sum_{m=0}^{(N/2)-1} x(2m) W_N^{2mk} + \sum_{m=0}^{(N/2)-1} x(2m+1) W_N^{k(2m+1)}$$

With $W_N^2 = W_{N/2}$ substitution, the latter equation above can be expressed as:

$$X(k) = \sum_{m=0}^{(N/2)-1} f_1(m) W_{N/2}^{km} + W_N^k \sum_{m=0}^{(N/2)-1} f_2(m) W_{N/2}^{km}$$

$$= F_1(k) + W_N^k F_2(k), k = 0, 1, \ldots, N-1$$

Since $F_1(k)$ and $F_2(k)$ are periodic, with period N/2, $F_1(k+N/2) = F_1(k)$ and $F_2(k+N/2) = F_2(k)$. In addition, the twiddle factor is $W_N^{k+N/2} = -W_N^k$. Hence the equation may be expressed as follows, resulting in a reduction in the number of multiplications from $N^2$ to $N/2 \log_2 N$ multiplications.

$$X(k) = F_1(k) + W_N^k F_2(k),$$

$$k = 0, 1, \ldots, \frac{N}{2} - 1$$

$$X\left(k + \frac{N}{2}\right) = F_1(k) - W_N^k F_2(k),$$

$$k = 0, 1, \ldots, \frac{N}{2} - 1$$

In this regard, as will be described in more detail below with regard to FIGS. 10-12, the VPE 22 can provide FFT operations with the same multiplier blocks 62(0-A) and accumulator blocks 72(0-A) as can be used to provide other arithmetic logic vector operations. Programmable data paths 90(3)-90(0), 91, and 92(3)-92(0), respectively of each multiplier 84(0)-84(3) (see FIG. 6) in the multiplier blocks 62(0)-62(A) (see FIG. 3) can be programmed to provide multiplication for a point of a Radix-$2^X$ butterfly vector operation according to the particular Radix-$2^X$ butterfly vector instruction being executed. Programmable input data paths 78(0)-78(A), internal data paths 80(0)-80(A), and/or output data paths 74(0)-74(A) of the accumulator blocks 72(0)-72(A) (see FIG. 3) can be programmed to accumulate the Radix-$2^X$ butterfly multiplication products from a multiplier block 62 among the plurality of multiplier blocks 62(0)-62(A) according to the Radix-$2^X$ butterfly vector instruction being executed. The programmable input data paths 78(0)-78(A), internal data paths 80(0)-80(A), and/or output data paths 74(0)-74(A) of the accumulator blocks 72(0)-72(A) can also be reprogrammed in other cycles to accumulate Radix-$2^X$ butterfly multiplication products from other multiplier blocks 62 among the plurality of multiplier blocks 62(0)-62(A) according to the Radix-$2^X$ butterfly vector instruction being executed. The final accumulated Radix-$2^X$ butterfly multiplication products accumulated by the accumulator blocks 72(0)-72(A) can provide N points of a FFT vector processing operation.

The multiplier blocks 62(0)-62(A) and accumulator blocks 72(0)-72(A) can also be configured to other related FFT operations, such as FFT with scaling, FFT with multiply, FFT with phase-ramp multiply, interpolating FFT, fast convolution, and FHT transforms. As a result, fewer VPEs can provide desired Radix-$2^X$ butterfly vector operations and other types of arithmetic logic vector operations in a vector processor, thus saving area in the vector processor while still retaining vector processing advantages of fewer register writes and faster vector instruction execution times over scalar processing engines.

When the number of data points N in the DFT is a power of 4 (i.e., $N=4^X$), a Radix-2 algorithm can be employed for the computation. However, for this case, it is more efficient computationally to employ a Radix-$2^X$ FFT algorithm. For example, a Radix-4 FFT algorithm can be provided by splitting or decimating an N-point input sequence into four sub-sequences, x(4n), x(4n+1), x(4n+2), x(4n+3), n=0, 1, ..., N/4-1.

$$X(p, q) = \sum_{l=0}^{3} \left[ W_N^{lq} F(l, q) \right] W_4^{lp}$$

-continued $$F(l, q) = \sum_{m=0}^{(N/4)-1} x(l, m) W_{N/4}^{mq}$$

$$p = 0, 1, 2, 3;$$

$$l = 0, 1, 2, 3;$$

$$q = 0, 1, 2, \ldots, \frac{N}{4} - 1$$

and $$x(l, m) = x(4m + 1)$$

$$X(p, q) = X\left(\frac{N}{4}p + q\right)$$

Thus, the four N/4-point DFTs F(l, q) obtained from the above equation are combined to yield the N-point DFT. The expression for combining the N/4-point DFTs defines a Radix-4 decimation-in-time butterfly operation, which can be expressed in matrix form as follows:

$$\begin{bmatrix} X(0, q) \\ X(1, q) \\ X(2, q) \\ X(3, q) \end{bmatrix} = \begin{bmatrix} 1 & 1 & 1 & 1 \\ 1 & -j & -1 & j \\ 1 & -1 & 1 & -1 \\ 1 & j & -1 & -j \end{bmatrix} \begin{bmatrix} W_N^0 F(0, q) \\ W_N^q F(1, q) \\ W_N^{2q} F(2, q) \\ W_N^{3q} F(3, q) \end{bmatrix}$$

The Radix-4 butterfly operation matrix shown above can be solved to recombine the N/4 points provided as a single point in an N-point DFT for point q. To solve the entire DFT for all points q, the single points calculated for in the N-point DFT can be accumulated.

In this regard, FIG. 10 is a conceptual schematic diagram of the VPE 22 in FIG. 3 with multipliers 84 in the multiply vector processing stage 60(1) (see FIG. 5) fused to two accumulator blocks 72(0), 72(1) in parallel in the accumulate vector processing stage 60(2) (see FIG. 8) to form a Radix butterfly circuit 146 to solve the Radix-4 butterfly operation matrix shown above. With reference to FIG. 10, the Radix butterfly circuit 146 is configured to perform either a Radix-2 or Radix-4 butterfly vector operation. The VPE 22 is programmed for a multiplier block 62 to be fused to four accumulators, accumulators 72[1][1], 72(1)(0) in accumulator block 72[1] and accumulators 72(0)(1), 72(0)(0) in accumulator block 72[0], which are configured in redundant carry-save format to provide the Radix butterfly circuit 146 in this embodiment. A discussion of the accumulator blocks 72 being capable of being configured in redundant carry-save format was previously discussed above with regard to FIGS. 7-9C. The multiplier block 84 can provide four (4) multiplication products of a single vector data input sample set 66 (i.e., a N/4 Radix point) multiplied by four (4) twiddle factors to provide one point of the N-point DFT. The number of multipliers 84 in the multiplier block 62 programmed to be included in the Radix butterfly circuit 146 is based on the bit width vector data input sample set 66 to be used in performing the Radix butterfly vector operation according to the particular Radix butterfly vector instruction being executed.

With continuing reference to FIG. 10, twiddle factor generators 148(3)-148(0) are provided in the VPE 22. The twiddle factor generators 148(3)-148(0) generate twiddle factors $W_N^q$ in butterfly lanes 149(3)-149(0), respectively, to be provided to the multiplier(s) 84 in the multiplier block 62 programmed to be included in the Radix butterfly circuit 146. By providing the twiddle factor generators 148(3)-148(0), the twiddle factors $W_N^q$ for the Radix butterfly vector operation can be provided. If the Radix butterfly circuit 146 is configured for a Radix-2 butterfly vector operation, only a single twiddle factor of $W_N^0$, which is unity ("1"), is needed from the twiddle factor generator 148(0). However, if the Radix butterfly circuit 146 is configured for a Radix-4 butterfly vector operation, four twiddle factors $W_N^3$-$W_N^0$ are needed to be generated by the twiddle factor generators 148(3)-148(0) according to the twiddle factor matrix below.

$$\begin{bmatrix} 1 & 1 & 1 & 1 \\ 1 & -j & -1 & j \\ 1 & -1 & 1 & -1 \\ 1 & j & -1 & -j \end{bmatrix}$$

In this embodiment, the same multiplier block 62 in FIG. 10 is repeated four (4) times and fused to four accumulators 72(1)(1), 72(1)(0), 72(0)(1), 72(0)(0). This is because the Radix butterfly circuit 146 in this embodiment can be configured wherein a single multiplier block 62 can provide four (4) multiplication products of a single vector data input sample set 66 (i.e., a N/4 Radix point) multiplied by four (4) twiddle factors to provide one point of the N-point DFT. The number of multipliers 84 in the multiplier block 62 programmed to be included in the Radix butterfly circuit 146 is based on the bit width vector data input sample set 66 to be used in performing the Radix butterfly vector operation according to the particular Radix butterfly vector instruction being executed. Also, while each accumulator 72[1][1], 72[1][0] in the accumulator block 72[1] and accumulator 72[0](1), 72[0](0) in the accumulator block 72[0] in the Radix butterfly circuit 146 in FIG. 10 is programmed to accumulate a N/4 Radix point, additional accumulator blocks 72 could be programmed to be included in the Radix butterfly circuit 146 depending on the bit width of the Radix butterfly operation.

Also in this embodiment, the Radix butterfly circuit 146 in FIG. 10 can provide N/2 log₂ N multiplications and four (4) accumulates for an N-point Radix-4 butterfly operation per clock cycle. Thus, only four (4) clock cycles are needed to complete one butterfly operation of an N-point Radix-4 butterfly vector operation. This is the same throughput as a Radix-2 butterfly operation. Thus, the Radix butterfly circuit 146 can complete a Radix-4 butterfly vector operation in N clock cycles. Also note that the VPE 22 according to the embodiments herein can be configured to provide a number of Radix butterfly circuits 146 according to the data path configurations for the multiplier blocks 62(0)-62(A) and the accumulator blocks 72(0)-72(A). Thus, if the VPE 22 can be configured to perform M number of N-point Radix butterfly vector operations per clock cycle, such as to perform a Radix-16 dragonfly vector operation as an example, the overall clock cycle count for the VPE 22 to perform a N-point Radix-4 butterfly transaction is reduced to (N/2 Log 2 N)/M. Further, by fusing the multiplier block 62 with the accumulator blocks 72[91], 72[0] configured in redundant carry-save format, providing a carry propagation path and a carry propagation add operation during each step of accumulation is not required as previously discussed, thereby saving additional processing time and power consumption.

To provide further illustration, FIG. 11 is a schematic diagram of one cycle of the Radix butterfly circuit 146 in FIG. 10 configured to perform either a Radix-2 or Radix-4 butterfly vector operation. A description of the Radix butterfly circuit 146 configured to perform a Radix-2 butterfly vector operation will first be described followed by a Radix-4 butterfly vector operation. In regard to a Radix-2 butterfly vector operation, as discussed above, the following equations are to be solved to provide an N point Radix-2 butterfly operation.

$$X(k) = F_1(k) + W_N^k F_2(k),$$

$$k = 0, 1, \ldots, \frac{N}{2} - 1$$

$$X\left(k + \frac{N}{2}\right) = F_1(k) - W_N^k F_2(k),$$

$$k = 0, 1, \ldots, \frac{N}{2} - 1$$

With continuing reference to FIG. 11, the vector data input sample sets 66[1], 66[0] are received in the multiply vector processing stage 60(1). The vector data input sample sets 66[1], 66[0] are comprised of the DFT point divided in two N/2-point data sequences $F_1(k)$ and $F_2(k)$, corresponding to the even-numbered and odd-numbered samples or points of X(k). 'k' represents one N/2 point in the sequence, which is accumulated for each cycle. The multiplier 84 would normally need to either provide two (2) multiplications to multiply $F_2(k)$ by the 'e' component and the power component of the twiddle factor W as an input on butterfly lane 149 to provide a vector multiply output sample sets 68[0] (i.e., $W_N^k F_2(k)$). However, since the twiddle factor for a Radix-2 butterfly operation is unity, the multiplier 84 can only be used to multiply $F_2(k)$ by 'e' in this example. Thus, a register save of an intermediate multiplication result by the multiplier 84 is saved. The accumulator 72[1](1) adds the vector multiply output sample sets 68[0] to data point $F_1(k)$ to provide a N/2 point in the even-numbered sequence X(k) as accumulated vector output sum 112[1](1) and accumulated vector output carry 117[1](1). The accumulator 72[0](1) adds the vector multiply output sample set 68[0] to a negation of data point $F_1(k)$ to provide a N/2 point in the odd-numbered sequence X(k+N/2) as accumulated vector output sum 112[0](1) and accumulated vector output carry 117[0](1). The negation circuit 106[0](1) negates the data point $F_1(k)$ before being added to vector multiply output sample set 68[0]. Additional vector data input sample sets 66[1], 66[0] are received and provided to the accumulators 72[1](1), 72[0](1) and accumulated with the accumulated vector output sum 112[1](1) and accumulated vector output carry 117[1](1), and accumulated vector output sum 112[0](1) and accumulated vector output carry 117[0](1), respectively, until the data sequences are summed to provide final accumulate output sample sets 76[1](1), 76[1], (0) representing the summation of the even-numbered sequence X(k) and the odd-numbered sequence X(k+N/2), respectively.

As discussed above, the Radix butterfly circuit 146 can also be programmed to provide a Radix-4 butterfly vector operation. In this regard, the vector data input sample set 66[0] containing the N/4 Radix points in vector format is received in the multiply vector processing stage 60(1). The vector data input sample set 66[0] is comprised of the DFT point divided in N/4-point data sequences $F_2(k)$ of samples or points of X(k). 'k' represents one N/4 point in the sequence, which is accumulated for each cycle. The multiplier 84 would normally perform two multiplications to multiply $F_2(k)$ by the 'e' component and determine the power component of the twiddle factor (i.e., $W_N^k$) to provide a vector multiply output sample set 68[0] (i.e., $W_N^k F_2(k)$). However, since a Radix-4 butterfly operation only includes four possible twiddle factors 1, -1, j, -j, complex multiplication of the power component of the twiddle factor can be avoided by simply providing negation of $F_2(k)$ for multiplication by twiddle factor -1, swapping of $F_2(k)$ for multiplication by twiddle factor j, and negation and swapping of $F_2(k)$ for multiplication by twiddle factor for -j. The negation and/or swapping of $F_2(k)$ can be programmed during a phase-ramp operation of the Radix butterfly circuit 146 that the multiplier 84 can instead be used to perform the multiplication of $F_2(k)$ by the 'e' component of the twiddle factor only during the first cycle to further save register saves and power consumption.

In this regard with continued reference to FIG. 11, accumulator 72[1](1) will always provide a twiddle factor of 1 according to row 1 of the Radix-4 twiddle factor matrix reproduced below. However, accumulator 72[1](0) must be able to provide any of the twiddle factors for a Radix-4 twiddle factor according to row 2 of the Radix-4 twiddle factor matrix reproduced below. Thus, accumulator 72[1](0) includes a negation circuit 106[1](0) and swap circuit 109[1](0) that is controlled to provide $+F_2(k)$, $-jF_2(k)$, $-F_2(k)$, and $+jF_2(k)$ according to each of the Radix-4 twiddle factors to the accumulators 72[1][1], 72[1][0] in the accumulator block 72[1] and accumulator 72[0](1), 72[0](0) in the accumulator block 72[0] for accumulation of each N/4 point sequence, respectively. The accumulator 72[0](1) must be able to provide any of the twiddle factors for a Radix-4 twiddle factor according to row 3 of the Radix-4 twiddle factor matrix reproduced below. Thus, accumulator 72[0](1) only requires negation circuit 106[0](1) to provide $+F_2(k)$ to the accumulators 72[1](1), 72[0](1) and $-F_2(k)$ to accumulators 72[1](0), 72[0](0) for accumulation of each N/4 point sequence, respectively. The accumulator 72[0](0) must be able to provide any of the twiddle factors for a Radix-4 twiddle factor according to row 4 of the Radix-4 twiddle factor matrix reproduced below. Thus, the accumulator 72[0](0)) includes a negation circuit 106[0](0) and swap circuit 109[0](0) that is controlled to provide $+F_2(k)$, $+jF_2(k)$, $-F_2(k)$, and $-jF_2(k)$ according to each of the Radix-4 twiddle factors to the accumulators 72[1][1], 72[1][0] in the accumulator block 72[1] and accumulators 72[0](1), 72[0](0) in the accumulator block 72[0] for accumulation of each N/4 point sequence, respectively.

$$\begin{bmatrix} 1 & 1 & 1 & 1 \\ 1 & -j & -1 & j \\ 1 & -1 & 1 & -1 \\ 1 & j & -1 & -j \end{bmatrix}$$

Thus in summary, the accumulators 72[1][1], 72[1][0], 72[0](1), 72[0](0) in the Radix butterfly circuit 146 in FIG. 11 are programmed to perform a Radix-4 butterfly vector operation, will perform the following calculations over four (4) cycles, as follows. These calculations are accumulated to provide four (4) N/4 accumulated point sequences, which can then be accumulated together to resolve the FFT.

| Cycle | A0 (116[1](1)) | A1 (116[1](0)) | A2 (116[0](1)) | A3 (116[0](0)) |
|---|---|---|---|---|
| Cycle 0 | $F_2(0)*W(0)$ | $F_2(0)*W(0)$ | $F_2(0)*W(0)$ | $F_2(0)*W(0)$ |
| Cycle 1 | $F_2(1)*W(1)$ | $-jF_2(1)*W(1)$ | $-F_2(1)*W(1)$ | $+jF_2(1)*W(1)$ |
| Cycle 2 | $F_2(2)*W(2)$ | $-F_2(2)*W(2)$ | $F_2(2)*W(2)$ | $+F_2(2)*W(2)$ |
| Cycle 3 | $F_2(3)*W(3)$ | $+jF_2(3)*W(3)$ | $-F_2(1)*W(3)$ | $-jF_2(1)*W(3)$ |

The VPE 22 can also be programmed to perform up to four (4) Radix butterfly circuits like the Radix butterfly circuit 146 in FIG. 11 to provide a Radix-16 butterfly operation (also known as "dragonfly operation") capability. In this scenario, the twiddle factors become more complex than simply +1, =1, +j, −j, thereby requiring complex multiplication by the multiplier 84 in each Radix butterfly circuit 146.

VPEs having programmable data path configurations for providing multi-mode Radix-$2^X$ butterfly vector processing operations, and according to concepts and embodiments discussed herein, including but not limited to the VPE 22 in FIGS. 2 and 3, may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 12:
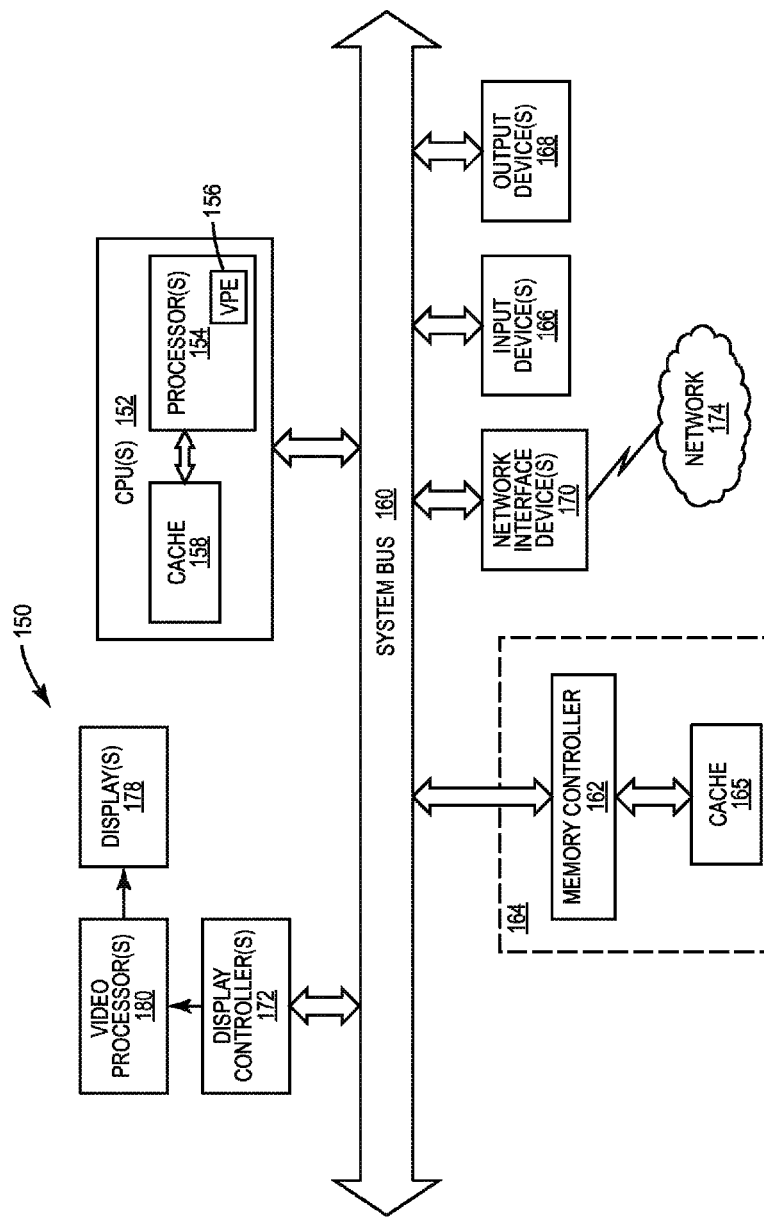
FIG. 12 is a block diagram of an exemplary processor-based system that can include a vector processor that includes a VPE having programmable data path configurations, so common circuitry and hardware in the VPE can be programmed to act as dedicated circuitry designed to perform specific types of vector operations in a highly efficient manner for multiple applications or technologies, without a requirement to provide separate VPEs, according to the embodiments disclosed herein.

In this regard, FIG. 12 illustrates an example of a processor-based system 150. In this example, the processor-based system 150 includes one or more processing units (PUs) 152, each including one or more processors or cores 154. The PU 152 may be the baseband processor 20 in FIG. 2 as a non-limiting example. The processor 154 may be a vector processor like the baseband processor 20 provided in FIG. 2 as a non-limiting example. In this regard, the processor 154 may also include a VPE 156, including but not limited to the VPE 22 in FIG. 2. The PU(s) 152 may have cache memory 158 coupled to the processor(s) 154 for rapid access to temporarily stored data. The PU(s) 152 is coupled to a system bus 160 and can intercouple master and slave devices included in the processor-based system 150. As is well known, the PU(s) 152 communicates with these other devices by exchanging address, control, and data information over the system bus 160. For example, the PU(s) 152 can communicate bus transaction requests to a memory controller 162 as an example of a slave device. Although not illustrated in FIG. 12, multiple system buses 160 could be provided, wherein each system bus 160 constitutes a different fabric.

Other master and slave devices can be connected to the system bus 160. As illustrated in FIG. 12, these devices can include a memory system 164, one or more input devices 166, one or more output devices 168, one or more network interface devices 170, and one or more display controllers 172, as examples. The memory system 164 can include memory 165 accessible by the memory controller 162. The input device(s) 166 can include any type of input device, including but not limited to input keys, switches, voice processors, etc. The output device(s) 168 can include any type of output device, including but not limited to audio, video, other visual indicators, etc. The network interface device(s) 170 can be any devices configured to allow exchange of data to and from a network 174. The network 174 can be any type of network, including but not limited to a wired or wireless network, a private or public network, a local area network (LAN), a wide local area network (WLAN), and the Internet. The network interface device(s) 170 can be configured to support any type of communication protocol desired.

The PUs 152 may also be configured to access the display controller(s) 172 over the system bus 160 to control information sent to one or more displays 178. The display controller(s) 172 sends information to the display(s) 178 to be displayed via one or more video processors 170, which process the information to be displayed into a format suitable for the display(s) 178. The display(s) 178 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the embodiments of dual voltage domain memory buffers disclosed herein may be implemented as electronic hardware, instructions stored in memory or in another computer-readable medium and executed by a processor or other processing device, or combinations of both. The arbiters, master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a processor, a DSP, an Application Specific Integrated Circuit (ASIC), an FPGA or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A vector processing engine (VPE) configured to provide at least one multi-mode Radix-$2^x$ butterfly vector processing circuit, comprising:
   at least one multiply vector processing stage comprising at least one multiplier block configured to:
      receive a Radix vector data input sample set from a plurality of Radix vector data input sample sets from a first input data path among a plurality of input data paths;
      multiply the Radix vector data input sample set with a twiddle factor component to provide a Radix vector multiply output sample set in a plurality of multiply output data paths based on a programmable multiply data path configuration according to a Radix butterfly vector instruction executed by the at least one multiply vector processing stage; and
   at least one accumulation vector processing stage comprising a plurality of accumulator blocks, each accumulator block among the plurality of accumulator blocks configured to:
      receive a plurality of Radix vector multiply output sample sets from a multiply output data path among the plurality of multiply output data paths based on a programmable accumulator data path configuration;
      apply a twiddle factor input to the received plurality of Radix vector multiply output sample sets based on the programmable accumulator data path configuration;
      accumulate the plurality of Radix vector multiply output sample sets with the applied twiddle factor input to provide a Radix vector accumulated result sample set based on the programmable accumulator data path configuration; and
      provide the Radix vector accumulated result sample set in an output data path among a plurality of output data paths; and
   an output processing stage configured to receive a plurality of Radix vector accumulated result sample sets from each of the plurality of accumulator blocks;
   wherein the plurality of multiply output data paths are programmable to fuse the at least one multiplier block to the plurality of accumulator blocks to form the least one multi-mode Radix-$2^x$ butterfly vector processing circuit.

2. The VPE of claim 1, further comprising at least one adder configured to add the plurality of Radix vector accumulated result sample sets to provide a Radix butterfly result for the Radix butterfly vector instruction.

3. The VPE of claim 1, wherein the twiddle factor component is an 'e' component.

4. The VPE of claim 1, wherein each accumulator block among the plurality of accumulator blocks further comprises a negation circuit configured to negate a received Radix vector multiply output sample set among the plurality of Radix vector multiply output sample sets to apply the twiddle factor input of negative one (−1) based on the programmable accumulator data path configuration for each accumulator block according to the Radix butterfly vector instruction.

5. The VPE of claim 4, wherein each accumulator block among the plurality of accumulator blocks further comprises a swap circuit configured to convert the negated Radix vector multiply output sample set to a negated complex Radix vector multiply output sample set to apply the twiddle factor input of '−j' based on the programmable accumulator data path configuration for each accumulator block according to the Radix butterfly vector instruction.

6. The VPE of claim 1, wherein each accumulator block among the plurality of accumulator blocks further comprises a swap circuit configured to convert a received Radix vector multiply output sample set among the plurality of Radix vector multiply output sample sets to a complex Radix vector multiply output sample set to apply the twiddle factor input of 'j' based on the programmable accumulator data path configuration for each accumulator block according to the Radix butterfly vector instruction.

7. The VPE of claim 1, wherein each accumulator block among the plurality of accumulator blocks is configured to apply the twiddle factor input to the received plurality of Radix vector multiply output sample sets as a Radix-2 butterfly twiddle factor input based on the programmable accumulator data path configuration for each accumulator block configured according to a Radix-2 butterfly vector instruction.

8. The VPE of claim 1, wherein each accumulator block among the plurality of accumulator blocks is configured to apply the twiddle factor input to the received plurality of Radix vector multiply output sample sets as a Radix-4 butterfly twiddle factor input based on the programmable accumulator data path configuration for each accumulator block configured according to a Radix-4 butterfly vector instruction.

9. The VPE of claim 1, further comprising a twiddle factor generator configured to generate the twiddle factor input.

10. The VPE of claim 1, wherein the at least one multiplier block is comprised of a plurality of multiplier blocks to provide a plurality of multi-mode Radix-$2^x$ butterfly vector processing circuits.

11. The VPE of claim 1, wherein the programmable multiply data path configuration and the programmable accumulator data path configuration are each configured to be reconfigured based on the executed Radix butterfly vector instruction.

12. The VPE of claim 11, wherein the programmable multiply data path configuration and the programmable accumulator data path configuration are each configured to be reconfigured for each Radix butterfly vector instruction executed by the VPE.

13. The VPE of claim 12, wherein the programmable multiply data path configuration and the programmable accumulator data path configuration are each configured to be reconfigured on each clock cycle of the Radix butterfly vector instruction executed by the VPE.

14. The VPE of claim 1, wherein each accumulator block among the plurality of accumulator blocks comprises at least one carry-save accumulator each configured to:
   receive the plurality of Radix vector multiply output sample sets as each comprising at least one Radix vector input sum and at least one Radix vector input carry;

receive at least one previous accumulated Radix vector output sum and at least one previous accumulated Radix vector output carry;

accumulate at least one current accumulated Radix vector output sum comprised of the at least one Radix vector input sum accumulated to the at least one previous accumulated Radix vector output sum, as the at least one current Radix vector accumulated output sum;

accumulate at least one current accumulated Radix vector output carry comprised of the at least one Radix vector input carry accumulated to the at least one previous accumulated Radix vector output carry, as the at least one current accumulated Radix vector output carry; and provide the at least one current accumulated Radix vector output sum and the at least one current accumulated Radix vector output carry as at least one Radix vector accumulated result sample sets among the Radix vector accumulated result sample sets in the output data path among the plurality of output data paths.

15. The VPE of claim 14, wherein the at least one carry-save accumulator is configured to not propagate the at least one previous accumulated Radix vector output carry to the at least one Radix vector input sum and the at least one Radix vector input carry.

16. The VPE of claim 14, wherein the at least one carry-save accumulator is further configured to maintain the at least one current accumulated Radix vector output sum in a first vector accumulated data path and the at least one current accumulated Radix vector output carry in a second vector accumulated data path separate from the first vector accumulated data path.

17. The VPE of claim 14, wherein the at least one carry-save accumulator comprises at least one compressor configured to:

receive the at least one Radix vector input sum and the at least one Radix vector input carry;

receive the at least one previous accumulated Radix vector output sum and the at least one previous accumulated Radix vector output carry;

generate the at least one current accumulated Radix vector output sum comprised of the at least one Radix vector input sum accumulated to the at least one previous accumulated Radix vector output sum, as the at least one current Radix vector accumulated output sum; and generate the at least one current accumulated Radix vector output carry comprised of the at least one Radix vector input carry accumulated to the at least one previous accumulated Radix vector output carry, as the at least one current accumulated Radix vector output carry.

18. The VPE of claim 17, wherein the at least one compressor is comprised of at least one 4:2 compressor.

19. The VPE of claim 1, further comprising an input read stage configured to provide the plurality of Radix vector data input sample sets of a width of a vector array in an input data path among the plurality of input data paths.

20. The VPE of claim 1, wherein the plurality of accumulator blocks are not configured to store the received plurality of Radix vector multiply output sample sets in a vector register.

21. The VPE of claim 1, wherein the at least one multi-mode Radix-$2^x$ butterfly vector processing circuit is configured to execute a Fast Fourier Transform (FFT) vector instruction.

22. The VPE of claim 1, wherein the at least one Radix-$2^x$ butterfly vector processing circuit is configured to execute an interpolating FFT vector instruction.

23. An apparatus for processing Radix-$2^x$ vector data in a multi-mode Radix-$2^x$ butterfly vector processing circuit processing in a vector processing engine (VPE), comprising:

means for receiving a Radix vector data input sample set from a plurality of Radix vector data input sample sets from a first input data path among a plurality of input data paths in at least one multiplier block in at least one multiply vector processing stage;

means for multiplying, in the at least one multiplier block, the Radix vector data input sample set with a twiddle factor component to provide a Radix vector multiply output sample set in a plurality of multiply output data paths based on a programmable multiply data path configuration according to a Radix butterfly vector instruction executed by the at least one multiply vector processing stage;

means for receiving a plurality of Radix vector multiply output sample sets from a multiply output data path among the plurality of multiply output data paths based on a programmable accumulator data path configuration in each accumulator block among a plurality of accumulator blocks in at least one accumulation vector processing stage;

means for applying a twiddle factor input to the received plurality of Radix vector multiply output sample sets based on the programmable accumulator data path configuration;

means for accumulating the plurality of Radix vector multiply output sample sets with the applied twiddle factor input to provide a Radix vector accumulated result sample set based on the programmable accumulator data path configuration;

means for providing the Radix vector accumulated result sample set in an output data path among a plurality of output data paths;

means for receiving in an output processing stage, a plurality of Radix vector accumulated result sample sets from each of the plurality of accumulator blocks; and means for fusing the at least one multiplier block to the plurality of accumulator blocks using the plurality of multiply output data paths to form the multi-mode Radix-$2^x$ butterfly vector processing circuit.

24. A method of processing Radix-$2^x$ vector data in a multi-mode Radix-$2^x$ butterfly vector processing circuit processing in a vector processing engine (VPE), comprising:

receiving a Radix vector data input sample set from a plurality of Radix vector data input sample sets from a first input data path among a plurality of input data paths in at least one multiplier block in at least one multiply vector processing stage;

multiplying, in the at least one multiplier block, the Radix vector data input sample set with a twiddle factor component to provide a Radix vector multiply output sample set in a plurality of multiply output data paths based on a programmable multiply data path configuration according to a Radix butterfly vector instruction executed by the at least one multiply vector processing stage;

receiving a plurality of Radix vector multiply output sample sets from a multiply output data path among the plurality of multiply output data paths based on a programmable accumulator data path configuration in each accumulator block among a plurality of accumulator blocks in at least one accumulation vector processing stage;

applying a twiddle factor input to the received plurality of Radix vector multiply output sample sets based on the programmable accumulator data path configuration;

accumulating the plurality of Radix vector multiply output sample sets with the applied twiddle factor input to provide a Radix vector accumulated result sample set based on the programmable accumulator data path configuration;

providing the Radix vector accumulated result sample set in an output data path among a plurality of output data paths;

receiving in an output processing stage, a plurality of Radix vector accumulated result sample sets from each of the plurality of accumulator blocks; and fusing the at least one multiplier block to the plurality of accumulator blocks using the plurality of multiply output data paths to form the multi-mode Radix-$2^x$ butterfly vector processing circuit.

25. The method of claim 24, further comprising adding the plurality of Radix vector accumulated result sample sets to provide a Radix butterfly result for the Radix butterfly vector instruction.

26. The method of claim 24, further comprising negating a received Radix vector multiply output sample set among the plurality of Radix vector multiply output sample sets to apply the twiddle factor input of negative one (−1) based on the programmable accumulator data path configuration for each accumulator block according to the Radix butterfly vector instruction.

27. The method of claim 26, further comprising swapping the received Radix vector multiply output sample set to convert the negated Radix vector multiply output sample set to a negated complex Radix vector multiply output sample set to apply the twiddle factor input of '−j' based on the programmable accumulator data path configuration for each accumulator block according to the Radix butterfly vector instruction.

28. The method of claim 24, further comprising swapping the Radix vector multiply output sample set to convert the received Radix vector multiply output sample set among the plurality of Radix vector multiply output sample sets to a complex Radix vector multiply output sample set to apply the twiddle factor input of 'j' based on the programmable accumulator data path configuration for each accumulator block according to the Radix butterfly vector instruction.

29. The method of claim 24, further comprising not storing the received plurality of Radix vector multiply output sample sets in a vector register.

* * * * *